(12) United States Patent
Zang et al.

(10) Patent No.: US 11,842,178 B2
(45) Date of Patent: Dec. 12, 2023

(54) COMPILER-LEVEL GENERAL MATRIX MULTIPLICATION CONFIGURATION OPTIMIZATION

(71) Applicant: Huawei Technologies Co., Ltd., Shenzhen (CN)

(72) Inventors: Hui Zang, Cupertino, CA (US); Huaqing Zhang, San Jose, CA (US); Xiaolin Cheng, San Ramon, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 466 days.

(21) Appl. No.: 17/182,753

(22) Filed: Feb. 23, 2021

(65) Prior Publication Data

US 2021/0200521 A1 Jul. 1, 2021

Related U.S. Application Data

(63) Continuation of application No. PCT/US2019/033352, filed on May 21, 2019.
(Continued)

(51) Int. Cl.
*G06F 8/40* (2018.01)
*G06F 8/41* (2018.01)
*G06F 7/16* (2006.01)

(52) U.S. Cl.
CPC .............. *G06F 8/443* (2013.01); *G06F 7/16* (2013.01); *G06F 8/447* (2013.01)

(58) Field of Classification Search
CPC ........... G06F 17/16; G06F 8/443; G06F 8/447
See application file for complete search history.

(56) References Cited

U.S. PATENT DOCUMENTS

2017/0344514 A1* 11/2017 Zhou ....................... G06F 17/16
2019/0095399 A1* 3/2019 Chadha ................... G06F 7/523

FOREIGN PATENT DOCUMENTS

WO WO-2020050886 A1 3/2020

OTHER PUBLICATIONS

R. Zhao et al., "Hardware Compilation of Deep Neural Networks: An Overview," 2018 IEEE 29th International Conference on Application-specific Systems, Architectures and Processors (ASAP), Milan, Italy, 2018, pp. 1-8, doi: 10.1109/ASAP.2018.8445088. (Year: 2018).*
(Continued)

*Primary Examiner* — Hanh Thi-Minh Bui
(74) *Attorney, Agent, or Firm* — Schwegman Lundberg & Woessner, P.A.

(57) ABSTRACT

A system and method is provided for optimizing general matrix multiplication (GEMM) on target hardware by splitting matrices to be multiplied into tiles and formulating a tiling configuration search problem for matrices to be multiplied that explores a configuration search space to identify an optimal tiling configuration that minimizes running time on the target hardware for multiplication of matrices A (m×k) and B (k×n) on the target hardware for respective configuration states as a function of matrix parameters m, k, and n, and numbers of respective nested loops for each dimension m, k, and n, respectively. The optimal tiling configuration for the target hardware is obtained by implementing a Greedy Best-First-Search (GBFS) algorithm or a Neighborhood Actor Advantage Critic (N-A2C) algorithm that optimizes the running time for multiplication of the matrices on the target hardware, and the target hardware is configured and computations are run accordingly.

17 Claims, 15 Drawing Sheets

Related U.S. Application Data

(60) Provisional application No. 62/727,423, filed on Sep. 5, 2018.

(56) References Cited

OTHER PUBLICATIONS

"International Application Serial No. PCT/US2019/033352, International Search Report dated Aug. 29, 2019", 5 pgs.

"International Application Serial No. PCT/US2019/033352, Written Opinion dated Aug. 29, 2019", 8 pgs.

Bondhugula, Uday, et al., "PLuTo: A Practical and Fully Automatic Polyhedral Program Optimization System", [Online] Retrieved from the internet: <http://www.ece.lsu.edu/jxr/Publications-pdf/tr70-07.pdf>, (Mar. 2, 2008), 15 pgs.

Chen, Chun, et al., "A Systematic Approach to Model-Guided Empirical Search for Memory Hierarchy Optimization", Languages And Compilers For Parallel Computing;[Lecture Notes In Computer Science;;Lncs], Springer Berlin Heidelberg, Berlin, (Nov. 2, 2006), 433-440.

Chen, Tianqi, et al., "TVM: An Automated End-to-End Optimizing Compiler for Deep Learning", 13th USENIX Symposium on Operating Systems Design and Implementation (OSDI 18), pp. 578-594, Carlsbad, CA (2018), (Feb. 12, 2018), 578-594.

Chen, Tianqi, et al., "XGBoost: A Scalable Tree Boosting System", In Proceedings of the 22nd ACM SIGKDD Conference on Knowledge Discovery and Data Mining, [Online] Retrieved from the internet: <https://arxiv.org/abs/1603.02754v3>, (Aug. 13, 2016), 785-794.

Chetlur, Sharan, et al., "cuDNN: Efficient Primitives for Deep Learning", arXiv:1410.0759v3, (Dec. 18, 2014), 9 pgs.

Das, Dipankar, et al., "Distributed Deep Learning Using Synchronous Stochastic Gradient Descent", arXiv preprint arXiv:1602.06709 (2016), (Feb. 22, 2016), 10 pgs.

Ganser, Stefan, et al., "Iterative Schedule Optimization for Parallelization in the Polyhedron Model", ACM Transactions On Architecture And Code Optimization, Association For Computing Machinery, 2 Penn Plaza, Suite 701 Neyork Ny 10121-0701, vol. 14, No. 3, (Aug. 22, 2017), 26 pgs.

Kisuki, T, et al., "Iterative Compilation in Program Optimization", T.J. Watson Research Center, Yorktown Heights, NY (hosted by IBM), [Online] Retrieved from the internet: <http://liacs.leidenuniv.nl/assets/PDF/TechRep/tr00-03.pdf>, (Aug. 10-12, 2000), 17 pgs.

Ragan-Kelley, Jonathan, et al., "Halide: a language and compiler for optimizing 10 parallelism, locality, and recomputation in image processing pipelines", ACM SIGPLAN Notices, 48(6):519-530 (2013) [abstract only], (2013), 519-530.

Renganarayana, Lakshminaryanan, et al., "A Geometric Programming Framework for Optimal Multi-Level Tiling", Supercomputing, 2004. Proceedings Of The Acm/Ieee Sc2004 Conference Pittsburgh, Pa, Nov. 6-12, 2004, (Nov. 6, 2004), 14 pgs.

Truong, Leonard, et al., "Latte: A Language, Compiler, and Runtime for Elegant and Efficient Deep Neural Networks", ACM SIGPLAN Notices, 51(6): 209-223 (2016), (2016), 209-223.

"International Application Serial No. PCT/US2019/033352, International Preliminary Report on Patentability dated Mar. 18, 2021", 10 pgs.

Chen, Tianqi, et al., "Learning to Optimize Tensor Programs", arXiv preprint arXiv:1805.08166, (2018), 16 pgs.

Zoph, Barret, et al., "Neural architecture search with reinforcement learning", arXiv preprint arXiv:1611.01578, (2016), 15 pgs.

\* cited by examiner (A) FULLY-CONNECTED LAYER (B) CONVOLUTIONAL LAYER

|   | A × B | |
|---|---|---|
|   | NUM. OF SPLITS (M × K) | DENOTATIONS (K × N) |
| M | $d_m$ | $(m_0, m_1, ..., m_{d_m-1})$ |
| K | $d_k$ | $(k_0, k_1, ..., k_{d_k-1})$ |
| N | $d_n$ | $(n_0, n_1, ..., n_{d_k-1})$ | s.t. $\Pi_i m_i = M$, $\Pi_j n_j = N$, $\Pi_l k_l = K$

FIG. 3

COMPILER-LEVEL GENERAL MATRIX MULTIPLICATION CONFIGURATION OPTIMIZATION

CROSS-REFERENCE TO RELATED APPLICATION

This application is a continuation application of International Application No. PCT/US2019/033352, filed May 21, 2019, which claims the benefit of priority to U.S. Provisional Patent Application Ser. No. 62/727,423, entitled "Compiler-Level General Matrix Multiplication Optimization," and filed Sep. 5, 2018, the benefit of priority of each of which is claimed herein, and which applications and publication are hereby incorporated herein by reference in their entirety.

TECHNICAL FIELD

This application is directed to general matrix multiplication (GEMM), and in particular to compiler-level GEMM configuration optimization for applications such as deep learning.

BACKGROUND

In recent years, deep learning has been attracting increasing attention from both academia and industry. With its own advances in algorithmic and architectural design, significant improvement in computational hardware (e.g., graphics processing unit (GPU) and tensor processing unit (TPU)), and availability of an enormous amount of labeled data, deep learning has shown success in many domains, such as computer vision, natural language processing, speech recognition, health care, finance, etc. There is no doubt that deep learning solutions will be increasingly popular in the upcoming years.

However, efficiently computing deep learning models (both training and inference models) on various hardware is a difficult task, which involves end-to-end compiler optimization at several levels from computational graphs to operators, and down to executable code on target hardware. A computational graph is a global view of operators and data flow among them. Within a graph, operators specify various computations that are required for individual operations on tensors. Current optimization techniques at the computational graph level are hardware agnostic and independent from the implementation of operators within a graph. For example, a standard procedure, operator fusion, combines multiple operators into a single kernel, avoiding latency introduced by write-back and loading of intermediate results into memory. At the operator level, existing optimization is mostly limited to specific implementation for a framework (e.g., TensorFlow XLA) or proprietary library for a particular target device (e.g., Nvidia cuDNN). Such libraries have been built mostly based on expert knowledge and manual tuning to perform effectively and efficiently.

Deep learning models are expected to run on diverse hardware platforms (CPU, GPU, FPGA, ASIC, SoC, etc.) with very different characteristics that can be leveraged to optimize various deep learning operations. To efficiently map deep learning operation/workload to a broader range of hardware, a Tensor Virtual Machine (TVM) has been proposed as a general compiler framework for automated tensor operator optimization. In this framework, a configuration space can be defined for each operator. An operator is optimized by finding a configuration that can optimize a performance metric (e.g., the lowest running time). Configuration is the detailed specification of how an operator is computed and executed on target hardware. For example, in matrix multiplication, tiling is utilized to make computation more efficient since hardware does not support compute matrices with variable sizes. Various tiling strategies for tiling matrices in blocks with GEMM are required to compute large matrix multiplication iteratively. Thus, different strategies may generate configurations that have significantly different performance. Configuration space for individual operators may have different structures and properties.

With multiple AI frameworks and a wide range of hardware involved in deep learning applications, it is important yet challenging for compiler-level optimization to efficiently and flexibly harmonize AI algorithms with the underlying hardware and optimize the performance of various deep learning applications. This space has been explored in the prior art. For example, CuDNN (Chetlur, et al., "cuDNN: Efficient primitives for deep learning," arXiv preprint arXiv:1410.0759 (2014)) provides highly efficient implementations of various deep neural network layers and is considered the standard for accelerating deep learning on Nvidia GPUs. Also, NNPACK and PCL-DNN (Das, et al., "Distributed deep learning using synchronous stochastic gradient descent," arXiv preprint arXiv:1602.06709 (2016)) similarly provide accelerations in x86 processors. On the other hand, Latte (Truong, et al., "Latte: a language, compiler, and runtime for elegant and efficient deep neural networks," ACM SIGPLAN Notices, 51(6): 209-223 (2016)) provides a natural abstraction for specifying new layers and applies domain-specific and general computation graph optimization. XLA (Accelerated Linear Algebra) optimizes TensorFlow computations in terms of speed, memory usage, and portability via just-in-time (JIT) compilation or ahead-of-time (AOT) compilation.

However, the aforementioned approaches perform either graph-level or operator-level optimization during compilation and they are not generic enough to accommodate all AI frameworks and hardware. Based on the structure of Halide (Ragan-Kelley, et al., "Halide: a language and compiler for optimizing parallelism, locality, and recomputation in image processing pipelines," ACM SIGPLAN Notices, 48(6):519-530 (2013)), Chen, et al., in "TVM: An automated end-to-end optimizing compiler for deep learning," $13^{th}$ USENIX Symposium on Operating Systems Design and Implementation (OSDI 18), pp. 578-594, Carlsbad, Calif. (2018) propose a general end-to-end compilation optimization framework combining a Neural Network Virtual Machine (NNVM), an open compiler for AI frameworks, for computation graph optimization and the Tensor Virtual Machine (TVM) described by Chen, et al., for tensor operator optimization. Currently, in TVM, a tuning method based on XGBoost (Chen and Guestrin, "Xgboost: A scalable tree boosting system," In Proceedings of the $22^{nd}$ ACM SIGKDD international conference on knowledge discovery and data mining, pp. 785-794, ACM (2016)) is considered the state-of-the-art method for GEMM configuration optimization and has shown superior performance over other methods. However, the random walk exploration implemented by XGBoost always starts at a fixed or random point. The walk is totally random for a large exploration space. The exploration steps determine the preference between exploration and exploitation. With larger steps, the agent will explore the space more, while with smaller steps, the agent can exploit the optimal search direction.

For configuration optimization, the intuitive method is grid search, where all possible configuration candidates are tested sequentially to find the configuration with best performance. A heuristic grid search guarantees to find the global optimal configurations, but the number of tested configuration candidates grows exponentially with the dimension of configuration space. Therefore, its usage has been limited to problems with a small search space or in combination with a manual search. Random search has been proposed where the configurations are randomly selected to be tested and is shown empirically and theoretically to be more efficient than a grid search for configuration tuning.

As an instance of Bayesian optimization, sequential model-based optimization (SMBO) shows its strength in configuration tuning by iteratively updating the underlying expected improvement, exploring new data through an acquisition function, and training a regression model. The general method has been widely adopted and implemented.

From another perspective, a series of evolutionary approaches have been explored, including the broad class of genetic algorithms (GA), differential evolution, estimation of distribution algorithms, and particle swarm optimization. Evolutionary strategies (ES) have been shown to perform efficiently in configuration tuning. Based on the concept, Covariance Matrix Adaptation Evolution Strategy (CMA-ES) has shown excellent performance by smartly updating the mean, step size and covariance matrix for each evolution. Natural Evolution Strategies apply natural gradients to update configuration search policy so as to achieve high expected fitness and to discover a high-performance configuration.

More recently, researchers at Google have applied deep reinforcement learning with a RNN controller to optimize the configurations of neural network architectures and its components. The excellent tuning performance in a wide range of applications shows the potential of deep reinforcement learning in the configuration tuning area.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

Sample embodiments described herein focus on the GEneral Matrix Multiplication (GEMM) operator, which is an important linear algebra routine and is a fundamental operator in deep learning. GEMM computes the product (multiplication) of two matrices and the operator can be translated into nested loops controlled by a fixed set of parameters. Its optimization can be reduced to finding the optimal combination of parameter values in this set. Compilers need to translate these routines into low-level code optimized for specific hardware. Compiler-level optimization of GEMM has significant performance impact on training and executing deep learning models. However, as noted above, most deep learning frameworks rely on hardware-specific operator libraries in which GEMM optimization has been mostly achieved by manual tuning, which restricts the performance on different target hardware. The present disclosure analyzes the structure of the compiler configuration space and describes improved configuration tuning approaches for GEMM optimization.

The following description explores the relation between different configurations and defines the neighbor states of each configuration by employing a Markov Decision Process (MDP) for exploration over the configuration space. Based on the neighboring relations within the configuration space, the present application describes two algorithms for GEMM optimization based on the Tensor Virtual Machine (TVM) framework including a lightweight Greedy Best First Search (G-BFS) guided method based on heuristic search of a graph defined by vertices and edges and a Neighborhood Actor Advantage Critic (N-A2C) method based on reinforcement learning. These algorithms are used to search for an optimal configuration given two matrices to be multiplied.

These methods show significant performance improvement in both the optimality of the solution and the cost of search in terms of time and fraction of the search space explored. Specifically, the proposed methods achieve 24% and 40% savings in GEMM computation time over state-of-the-art XGBoost and RNN methods, respectively, for multiplying two 1024×1024 matrices on one Nvidia Titan X GPU while exploring only 0.1% of the search space.

The disclosure herein has at least three aspects.

A first aspect of the present disclosure relates to a computer-implemented method of optimizing general matrix multiplication (GEMM) on target hardware. The method includes splitting, by one or more processing devices, matrices to be multiplied into tiles and formulating a tiling configuration search problem for the matrices to be multiplied that explores a configuration search space to identify an optimal tiling configuration. The optimal tiling configuration minimizes a running time on the target hardware for multiplication of the matrices on the target hardware. The formulating includes formulating the tiling configuration search problem into the following optimization problem:

$$\min_{s} \text{cost}(s; m, k, n, d_m, d_k, d_n),$$

where s denotes a configuration state; cost denotes a running time for the configuration state s; m, k, and n are matrix parameters for multiplication of a first matrix A (m×k) by a second matrix B (k×n), to produce a matrix C (m×n), where m is a number of rows of a first matrix, k is number of columns of the first matrix and number of rows of a second matrix, and n is the number of columns of the second matrix; and $d_m$, $d_k$, $d_n$ are numbers of respective nested loops for each dimension m, k, and n, respectively. A GEMM computation on the target hardware is run based on the optimal tiling configuration.

In a first implementation according to the first aspect as such, the configuration search space A for the optimal tiling configuration is limited by $d_m$, $d_k$, and $d_n$, where $d_m$ is restricted to $2^x$, $d_k$ is restricted to $2^y$, and $d_n$ is restricted to $2^z$, where x, y, and z are non-negative integers.

In a second implementation according to the first aspect or any preceding implementation of the first aspect, a configuration state s is defined as $s=[s_m, s_k, s_n, J]$, where $s_m=[m_0, m_1, \ldots, m_{d_m-1}]$, $s_k=[k_0, k_1, \ldots, k_{d_k-1}]$, $s_n=[n_0, n_1, \ldots, n_{d_n-1}]$, and J is a binary number indicating whether the state s satisfies search constraints for searching tiling configurations on the matrices.

In a third implementation according to the first aspect or any preceding implementation of the first aspect, an action space A for exploring from a current state s[i,j] to another state is defined such that s[i]=s[i]*2 and s[j]=s[j]/2 where i and j are in the same split of m defined from dimension 0 to dimension $d_m-1$, k defined from dimension $d_m$ to dimension $d_m+d_n-1$, or n defined from dimension $d_m+d_n$ to dimension $d_m+d_n+d_k-1$.

In a fourth implementation according to the first aspect or any preceding implementation of the first aspect, each configuration state s is a unique state and a transition from one configuration state to another is defined as s'=step (s, a), where a is a particular action that transitions a current state s to state s', further comprising defining a reward function for the optimization problem as:

$$r(s, a) = \frac{1}{\text{cost}(s', m, k, n, d_m, d_k, d_n)},$$

where for each configuration state s' which can be accessed by any possible action a from one configuration state s, the state s' and the state s are neighbor states.

In a fifth implementation according to the first aspect or any preceding implementation of the first aspect, selecting the optimal tiling configuration for the matrices to be multiplied that optimizes the running time for multiplication of the matrices on the target hardware includes implementing a Greedy Best-First-Search (GBFS) algorithm to search for an optimal tiling configuration starting at a random starting state so or a selected starting state so to run respective configurations on the target hardware to find an optimal state s' with a minimum cost within one of a predetermined search time and a predetermined fraction of the configuration search space for the GBFS algorithm.

In a sixth implementation according to the first aspect or any preceding implementation of the first aspect, the configuration search space A is defined for the optimal tiling configuration for a random subset of neighbors p of a configuration state s where 1≤p≤total number of neighbors of s and a neighbor state s' for s in response to action a is s'=step (s, a).

In a seventh implementation according to the first aspect or any preceding implementation of the first aspect, selecting the optimal tiling configuration for the matrices to be multiplied that optimizes the running time for multiplication of the matrices on the target hardware comprises implementing a Neighborhood Actor Advantage Critic (N-A2C) algorithm to search for an optimal tiling configuration starting at a random or selected starting state so to run respective configurations on the target hardware to find an optimal state s' with a minimum cost within one of a predetermined search time and a predetermined fraction of the configuration search space.

In an eighth implementation according to the first aspect or any preceding implementation of the first aspect, neural networks of an actor and critic in the N-A2C algorithm are initialized with random weights and, for each episode of the N-A2C algorithm, the configuration search space A is searched for the optimal tiling configuration from the starting state so in T continuous steps using an ε-greedy algorithm for each step, where (1) with a probability of ε an action a guided by a policy generated by the actor's neural network for each state s is taken to get a next configuration state s' or (2) with a probability of 1−ε a random action a is chosen from a current configuration state s to get a next configuration state s'.

In a ninth implementation according to the first aspect or any preceding implementation of the first aspect, when a configuration state s' has not been visited before, the state s' is added to a collected candidate set and the T continuous steps are repeated until a number of collected states s' in the collected candidate set reaches a predefined threshold.

In a tenth implementation according to the first aspect or any preceding implementation of the first aspect, a number of the T continuous steps decays in value over iterations of exploration of the configuration search space A.

A second aspect of the present disclosure relates to a computing device for optimizing general matrix multiplication (GEMM) on target hardware. The computing device includes at least one processor and a machine-readable medium coupled to the at least one processor, with the machine-readable medium including instructions thereon that, when executed by the at least one processor, causes the at least one processor to perform operations including splitting matrices to be multiplied into tiles and formulating a tiling configuration search problem for the matrices to be multiplied that explores a configuration search space to identify an optimal tiling configuration that minimizes a running time on the target hardware for multiplication of the matrices on the target hardware, the formulating including formulating the tiling configuration search problem into the following optimization problem:

min cost (s; m, k, n, $d_m$, $d_k$, $d_n$),
s where s denotes a configuration state; cost denotes a running time for the configuration state s; m, k, and n are matrix parameters for multiplication of a first matrix A (m×k) by a second matrix B (k×n), to produce a matrix C (m×n), where m is a number of rows of a first matrix, k is number of columns of the first matrix and number of rows of a second matrix, and n is the number of columns of the second matrix; and $d_m$, $d_k$, $d_n$ are numbers of respective nested loops for each dimension m, k, and n, respectively. The at least one processor further executes instructions to run a GEMM computation on the target hardware based on the optimal tiling configuration.

In a first implementation according to the second aspect as such, the instructions further comprise instructions that when executed by the at least one processor limit the configuration search space A for the optimal tiling configuration by $d_m$, $d_k$, and $d_n$, where $d_m$ is restricted to $2^x$, $d_k$ is restricted to $2^y$, and $d_n$ is restricted to $2^z$, where x, y, and z are non-negative integers.

In a second implementation according to the second aspect as such or any preceding implementation form of the second aspect, the instructions further comprise instructions that when executed by the at least one processor define a configuration state s as s=[$s_m$, $s_k$, $s_n$, J], where $s_m$=[$m_0$, $m_1$, ..., $m_{dm-1}$], $s_k$=[$k_0$, $k_1$, ..., $k_{dk-1}$], $s_n$=[$n_0$, $n_1$, ..., $n_{dn-1}$], and J is a binary number indicating whether the state s satisfies search constraints for searching tiling configurations on matrices.

In a third implementation according to the second aspect as such or any preceding implementation form of the second aspect, the instructions further comprise instructions that when executed by the at least one processor define an action space A for exploring from a current state s[i,j] to another state such that s[i]=s[i]*2 and s[j]=s[j]/2 where i and j are in the same split of m defined as from dimension 0 to dimension $d_m$−1, k defined from dimension $d_m$ to dimension $d_m$+$d_n$−1, or n defined from dimension $d_m$+$d_n$ to dimension $d_m$+$d_n$+$d_k$−1.

In a fourth implementation according to the second aspect as such or any preceding implementation form of the second aspect, each configuration state s is a unique state and the instructions further comprise instructions that when executed by the at least one processor define a transition from one configuration state to another as s'=step (s, a), where a is a particular action that transitions a current state s to state s', and define a reward function for the optimization problem as:

$$r(s, a) = \frac{1}{\text{cost}(s', m, k, n, d_m, d_k, d_n)},$$

where for each configuration state s' which can be accessed by any possible action a from one configuration state s, the state s' and the state s are neighbor states.

In a fifth implementation according to the second aspect as such or any preceding implementation form of the second aspect, the instructions further comprise instructions that when executed by the at least one processor select the optimal tiling configuration for the matrices to be multiplied that optimizes the running time for multiplication of the matrices on the target hardware by implementing a Greedy Best-First-Search (GBFS) algorithm to search for an optimal tiling configuration starting at a random starting state so or a selected starting state so to run respective configurations on the target hardware to find an optimal state s' with a minimum cost within one of a predetermined search time and a predetermined fraction of the configuration search space for the GBFS algorithm.

In a sixth implementation according to the second aspect as such or any preceding implementation form of the second aspect, the instructions further comprise instructions that when executed by the at least one processor define the configuration search space A for the optimal tiling configuration for a random subset of neighbors p of a configuration state s where 1≤p≤total number of neighbors of s and a neighbor state s' for s in response to action a is s'=step (s, a).

In a seventh implementation according to the second aspect as such or any preceding implementation form of the second aspect, the instructions further comprise instructions that when executed by the at least one processor select the optimal tiling configuration for the matrices to be multiplied that optimizes the running time for multiplication of the matrices on the target hardware by implementing a Neighborhood Actor Advantage Critic (N-A2C) algorithm to search for an optimal tiling configuration starting at a random or selected starting state so to run respective configurations on the target hardware to find an optimal state s' with a minimum cost within one of a predetermined search time and a predetermined fraction of the configuration search space.

In an eighth implementation according to the second aspect as such or any preceding implementation form of the second aspect, the instructions further comprise instructions that when executed by the at least one processor initialize neural networks of an actor and critic in the N-A2C algorithm with random weights and, for each episode of the N-A2C algorithm, search the configuration search space A for the optimal tiling configuration from the starting state so in T continuous steps using an ε-greedy algorithm for each step, where (1) with a probability of ε an action a guided by a policy generated by the actor's neural network for each state s is taken to get a next configuration state s' or (2) with a probability of 1-ε a random action a is chosen from a current configuration state s to get a next configuration state s'.

In a ninth implementation according to the second aspect as such or any preceding implementation form of the second aspect, the instructions further comprise instructions that when executed by the at least one processor add the state s' to a collected candidate set and repeat the T continuous steps until a number of collected states s' in the collected candidate set reaches a predefined threshold when a configuration state s' has not been visited before.

In a tenth implementation according to the second aspect as such or any preceding implementation form of the second aspect, the instructions further comprise instructions that when executed by the at least one processor cause a number of the T continuous steps to decay in value over iterations of exploration of the configuration search space A.

A third aspect of the present disclosure relates to a computing device for optimizing general matrix multiplication (GEMM) on target hardware, the method comprising:
a tiling module splitting matrices to be multiplied into tiles;
an optimization module formulating a tiling configuration search problem for the matrices to be multiplied that explores a configuration search space to identify an optimal tiling configuration that minimizes a running time on the target hardware for multiplication of the matrices on the target hardware, the formulating including formulating the tiling configuration search problem into the following optimization problem:
$$\min_{s} \text{cost}(s; m, k, n, d_m, d_k, d_n),$$

where s denotes a configuration state; cost denotes a running time for the configuration state s; m, k, and n are matrix parameters for multiplication of a first matrix A (m×k) by a second matrix B (k×n), to produce a matrix C (m×n), where m is a number of rows of a first matrix, k is number of columns of the first matrix and number of rows of a second matrix, and n is the number of columns of the second matrix; and $d_m$, $d_k$, $d_n$ are numbers of respective nested loops for each dimension m, k, and n, respectively; and
an execution module running a GEMM computation on the target hardware based on the optimal tiling configuration.

The methods described herein can be performed and the instructions on computer readable media may be processed by the apparatus, and further features of the method and instructions on the computer readable media result from the functionality of the apparatus. Also, the explanations provided for each aspect and its implementation apply equally to the other aspects and the corresponding implementations. The different embodiments may be implemented in hardware, software, or any combination thereof. Also, any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 3 illustrates the multiplication of matrices A(m×k) and B(k×n) to produce splits $d_m$, $d_k$, and $d_n$ and the denotations indicated in Equations (2)-(4).

DETAILED DESCRIPTION

Figure 1A:
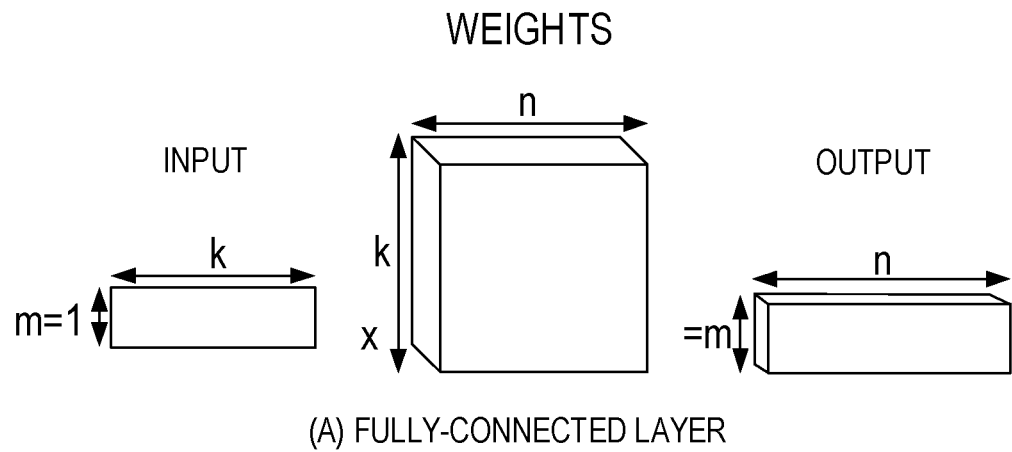
FIG. 1A illustrates Fully-Connected (FC) layers used as building blocks of feed-forward neural networks.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The systems and methods described herein optimize matrix multiplication using GEMM and matrix tiling techniques. An overview of these concepts is provided before formulating a GEMM tiling optimization problem addressed by the techniques described herein.

Matrix Multiplication

Most prior art deep learning frameworks rely on hardware-specific operator libraries for optimization, which is mostly achieved by manual tuning. Existing approaches perform either graph-level or operator-level optimization during compilation and are not generic enough to accommodate all AI frameworks and hardware. For a compiler-level GEneral Matrix Multiplication (GEMM) operator, there exists configurations for matrix tiling. Different configuration settings significantly impact the deep learning performance. Current GEMM configuration optimization relies on manual tuning, based on limited hardware architectures. For general hardware architectures, it is beneficial to set a smart tuner to automatically and efficiently search the GEMM configuration space and to select the one with the highest performance. The configurations can be automatically tuned in a grid search, where all possible configuration candidates in the configuration space are tested in the system and the one with the highest performance is selected. However, for general GEMM configuration optimization, it is time consuming for the system to test with a large majority of configuration candidates. The configuration space is large, but relations exist for similar configurations. A smart and efficient configuration tuner is required to search the optimal configuration with a low tuning time.

Matrix multiplication is an important component in AI and in many machine learning algorithms, particularly in the domain of deep learning. Training parameters (weights) of a deep neural network in a vectorized fashion essentially involves multiplication of matrices with various sizes. The input matrices in deep learning are normally very large (e.g., a 256×1024 matrix is multiplied with a 1024×128 matrix). Compilers are used to translate the matrix multiplication routines into low-level code optimized for specific hardware. Compiler-level optimization may be used to significantly improve performance.

Figure 1B:
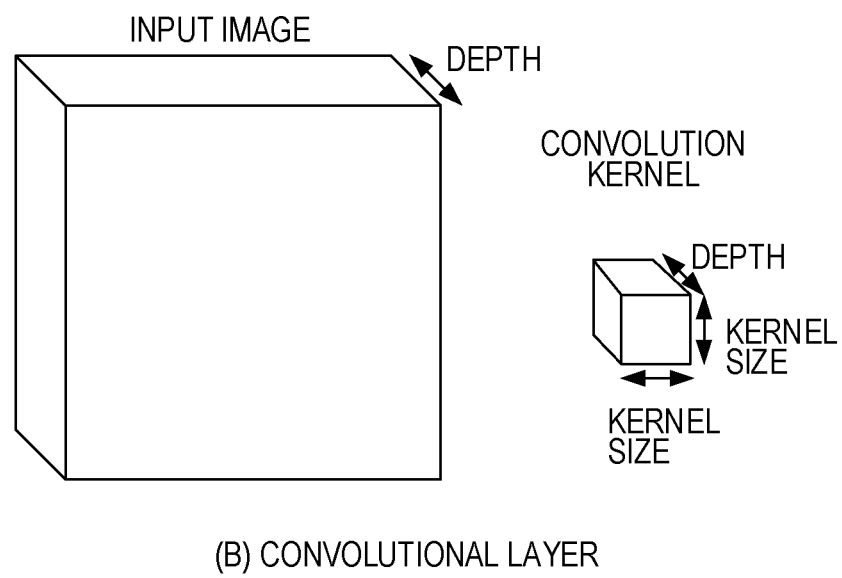
FIG. 1B illustrates Convolutional (Conv) layers used as building blocks of convolutional neural networks.

Fully-Connected (FC) layers (FIG. 1A) and convolutional (Conv) layers (FIG. 1B) are building blocks of feed-forward and convolutional neural networks. It is straightforward to identify matrix multiplication in computing an output value of a FC layer: each input has k elements and the FC layer has n neurons each with k weights. An FC layer is the multiplication of a m×k matrix (m is sample size) and a k×n matrix. A Conv layer appears to be a specialized operation, but it can be computed with matrix multiplication after rearranging data into a matrix format: each depth-wise (channel) slice of input can be added into an input matrix as a row; similarly, each kernel can be added into a kernel matrix as a column. The convolution operation becomes multiplication of those two matrices. When using AlexNet on image classification with an ImageNet dataset, the vast majority of computation time on forward pass (94.7% on GPU, and 88.7% on CPU) is consumed by Conv and FC layers.

GEMM and Matrix Tiling

GEMM is a general procedure ubiquitously used in linear algebra, machine learning, statistics, and many other areas and is implemented in the BLAS (Basic Linear Algebra Subprograms) library. GEMM multiplies two input matrices to produce an output matrix and has the following iterative form: $C \leftarrow \alpha AB + \beta C$. The key difference between GEMM in deep learning and regular matrix multiplication is that the input matrices handled in deep learning are normally much larger. For example, a single layer in a typical convolution neural network may require multiplication of a 256×1024 matrix by a 1024×128 matrix to produce a 256×128 matrix.

Regular three-for-loop matrix multiplication computation as shown below requires 34 million (256×1024×128) floating point operations (FLOPs):

For i in range(m):
    For j in range(n):

$C[i][j]=0$

For l in range(k):

$C[i][j]+=A[i][l]\times B[l][j]$

Modern deep neural networks may have hundreds of convolutional layers (e.g., ResNet152), and such networks may need several billions of FLOPs to finish operations in all layers for an input image.

Figure 2:
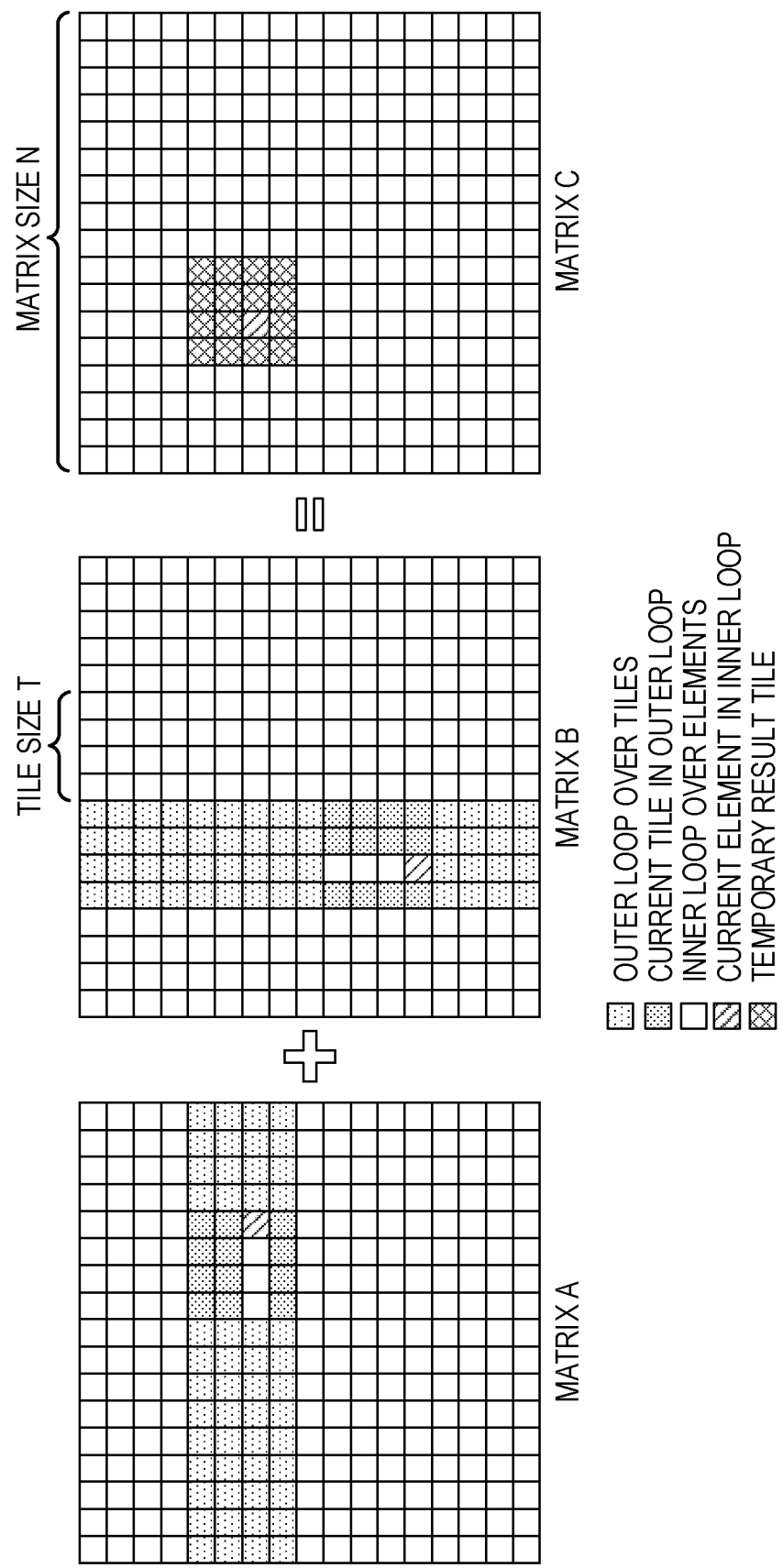
FIG. 2 illustrates a tiling strategy of GEneral Matrix Multiplication (GEMM) according to sample embodiments.

The time it takes to complete a GEMM computation largely depends on the cache hit rate of memory access. The large sizes of matrices usually prevent the entire matrices from being loaded into memory or cache. However, GEMM can optimize memory access by iteratively splitting computation into smaller tiles, often referred to as the tiling process. A resultant matrix is initialized with zeros. GEMM uses outer products to compute part of a tile of the result and accumulates it on top of what has been stored in that tile. A tile is loaded from memory into cache and accumulates a new result on top of that. FIG. 2 illustrates a tiling strategy of GEMM for the indicated tile sizes T and matrix sizes N.

Original memory access patterns need to be transformed to adapt to the cache policy of particular hardware. It is not straightforward to decide an optimal tiling strategy because it requires an accurate estimate of accessed array regions in loops to match with cache size of target hardware and to meet other constraints. An optimal tiling configuration chooses a tile size for each loop to collectively achieve the lowest running time on target hardware. The rest of this description addresses how to compute such an optimal tiling configuration.

Problem Formulation

TVM, as described by Chen, et al., in "TVM: An automated end-to-end optimizing compiler for deep learning," 13th USENIX Symposium on Operating Systems Design and Implementation (OSDI 18), pp. 578-594, Carlsbad, Calif. (2018), is used to investigate the performance of matrix tiling for GEMM. TVM is an open source deep learning compiler stack for CPUs, GPUs, and specialized accelerators. Further details regarding TVM may be found at TVM.ai. The objective is to find an optimal matrix tiling configuration that has the minimal running time on target hardware.

TVM is a compiler that exposes graph-level and operator-level optimizations to provide performance portability to deep learning workloads across diverse hardware back-ends. TVM solves optimization challenges specific to deep learning, such as high-level operator fusion, mapping to arbitrary hardware primitives, and memory latency hiding, for example. TVM also offers automated optimization of low-level programs to hardware characteristics by employing a novel learning-based cost modeling method for rapid exploration of code optimizations.

TVM facilitates matrix tiling optimization for GEMM by generating Intermediate Representation (IR) of a particular configuration. For example, a simple example IR of a GEMM tiling configuration with a blocking factor of 32 on an x86 CPU for GEMM with (m=1024, k=1024, n=1024) (shortened as (1024, 1024, 1024)) may be illustrated as:

```
produce C {
    for (x.outer, 0, 32) {
        for (y.outer, 0, 32) {
            for (x.inner.init, 0, 32) {
                for (y.inner.init, 0, 32) {
                    C[(((((x.outer*1024) + y.outer) + (x.inner.init*32))*32)
                        + y.inner.init)] = 0.000000f }}
            for (k.outer, 0, 256) {
                for (k.inner, 0, 4) {
                    for (x.inner, 0, 32) {
                        for (y.inner, 0, 32) {
                            C[(((((x.outer*1024) + y.outer) + (x.inner.init*32))*32)
                                + y.inner)]
                            += A[(((((x.outer*8192) + k.outer)*4 + k.inner) +
                                (x.inner* 1024))]
                                * B[(((((y.outer+ (k.outer)*128)) + (k.inner*32))*32)
                                    + y.inner)] }}}}}}
```

Generally, a GEMM tiling configuration can be defined as:

$$\vec{\xi}=\vec{\xi}_m\times\vec{\xi}_k\times\vec{\xi}_n \qquad (1)$$

where $$\vec{\xi}_m = \{[m_0, \ldots, m_i, \ldots, m_{d_m-1}] \mid \sqcap_{i=0}^{d_m-1} m_i = m\} \qquad (2)$$

$$\vec{\xi}_k = \{[k_0, \ldots, k_l, \ldots, k_{d_k-1}] \mid \sqcap_{l=0}^{d_k-1} k_l = k\} \qquad (3)$$

$$\vec{\xi}_n = \{[n_0, \ldots, n_j, \ldots, n_{d_n-1}] \mid \sqcap_{j=0}^{d_n-1} n_j = n\} \qquad (4)$$

Multiplication of two matrices A(m×k) and B(k×n) produces matrix C(m×n). $d_m$, $d_k$ and $d_n$ are the number of nested loops for each dimension m, k and n, respectively, where $d_m$ is restricted to $2^x$, $d_k$ is restricted to $2^y$, and $d_n$ is restricted to $2^z$, where x, y, and z are integers. $m_i$, $k_l$, $n_j$, $\forall_i \in [0, d_m)$ $\forall_l \in [0, d_k)$ $\forall_j \in [0, d_n)$, are the number of iterations of a respective loop. The configuration in the IR above is $m_0=m_1=32$, $k_0=256$, $k_1=4$, $n_0=n_1=32$, and $d_m=d_k=d_n=2$.

The optimal tiling configuration search problem can be formulated into the following optimization problem:

$$\min_s \text{cost}(s; m, k, n, d_m, d_k, d_n) \quad (5)$$

When applying the matrix multiplication between A and B, the objective is thus to find an optimal configuration of tiling parameters $[m_0, m_1, \ldots, k_0, k_1, \ldots, n_0, n_1, \ldots]$ that has the minimal running time on the target hardware. In this example, cost( ) denotes the running time for the configuration s, given the dimension of matrices (m, k, n) and the number of the nested loops on each dimension $d_m$, $d_k$, and $d_n$. As illustrated in FIG. 3, multiplication of matrices A(m×k) and B(k×n) produces splits of m, k, and n, respectively as $d_m$, $d_k$, and $d_n$, and the denotations indicated in Equations (2)-(4) above. The objective is to minimize the tuning time for GEMM configuration optimization on specific hardware (FPGA, TPU, GPU, etc.). Therefore, the $(\min_s)$ represents such a cost minimization operation or process, producing a minimum cost and therefore an optimal configuration of the tiling parameters $[m_0, m_1, \ldots, k_0, k_1, \ldots, n_0, n_1, \ldots]$.

Methodology

The methodology described herein solves the GEMM problem formulated above by modeling the optimization problem as a search problem through which an optimal configuration can be identified. Relationships between eligible configurations are identified, and a network of such configuration is created. Unlike XGBoost, the starting point of a new route is the optimal point from the previous exploration routes. The new route is determined by both random exploration and search direction using the Compiler-Level GEMM Optimization methods described herein. In sample embodiments, Compiler-Level GEMM Optimization is implemented using methods described herein as the G-BFS method guided by Greedy Best-First-Search and the N-A2C method using Neighborhood Actor Advantage Critic Reinforcement Learning that explore this network to find the best configuration. These two configuration tuning methods and the configuration search model together allow exploitation of relations between similar configurations.

Configuration Search Modeling

The configuration tuning problem is modeled as a Markov Decision Process (MDP), where each configuration is regarded as a unique state (or vertex) s in MDP defined as follows:

$$s=[s_m, s_k, s_n, J] \quad (5)$$

where $s_m=[m_0, m_1, \ldots, m_{d_m}-1] \in \xi_m$, $s_k=[k_0, k_1, \ldots, k_{d_k}-1] \in \xi_k$, $s_n=[n_0, n_1, \ldots, n_{d_n}-1] \in {}_n\xi_n$, and J is a binary number (true or false) indicating whether the state is legitimate (i.e., the state configuration satisfies the conditions of Eqns. (2)-(4), and the numbers are positive integers). Other constraints can be crafted to limit the search space and accelerate the search.

As in the GEMM application, with similar configuration settings (i.e., the configuration parameters for each dimension of two states are equal or close), the performance of the two states is more likely to be similar. In sample embodiments, the states represent different ways to multiply the matrices together. As explained below, tiling techniques are used to determine how to most efficiently store the states in hardware with limited memory. Taking advantage of the relationship between similar configurations and considering the constraints of the matrix size in each configuration, the action space (or edges in the matrix) may be defined as follows:

$$A=\{s_x[i] \leftarrow 2s_x[i] \text{ and } s_x[j] \leftarrow s_x[j]/2\} \quad (6)$$

where $\forall x \in \{m, k, n\}$, $\forall i, j \in (0, d_x)$, and $i \neq j$ and are in the same split of m defined as dm−1, k defined as dm+dn−1, or n defined as dm+dn+dk−1. Accordingly, a step function step may be defined as the transition from one state to another:

$$s'=\text{step}(s,a) \quad (7)$$

With the input of a particular action $a \in A$, the current state s transitions to state s'. The neighbors s' are thus defined as half or double the current state.

In addition, if the agent takes action a and transitions from state s to state s', the reward function may be defined as follows:

$$r(s, a) = \frac{1}{\text{cost}(s'; m, k, n, d_m, d_k, d_n)} \quad (8)$$

The reward function may also be represented as T(s')−T(s) where T(s') is the actual running time of the next state and T(s) is the actual running time of the current state. Following the MDP model, the agent is expected to determine its policy π to efficiently approach and discover a state s* with the lowest running time in the target hardware system. It will be appreciated that this approach takes advantage of relations with similar configurations.

Two different configuration tuning approaches for compiler-level GEMM optimization based on the configuration search model, guided by G-BFS and N-A2C reinforcement learning, respectively, will now be described as well as a discussion of their strengths in different scenarios. It will be appreciated that the optimization may be a one-time optimization for dimensions of matrices of a set size but that the optimization may be run each time there is a change in the matrix configurations or the hardware.

G-BFS Guided Tuning Method

Figure 4A:
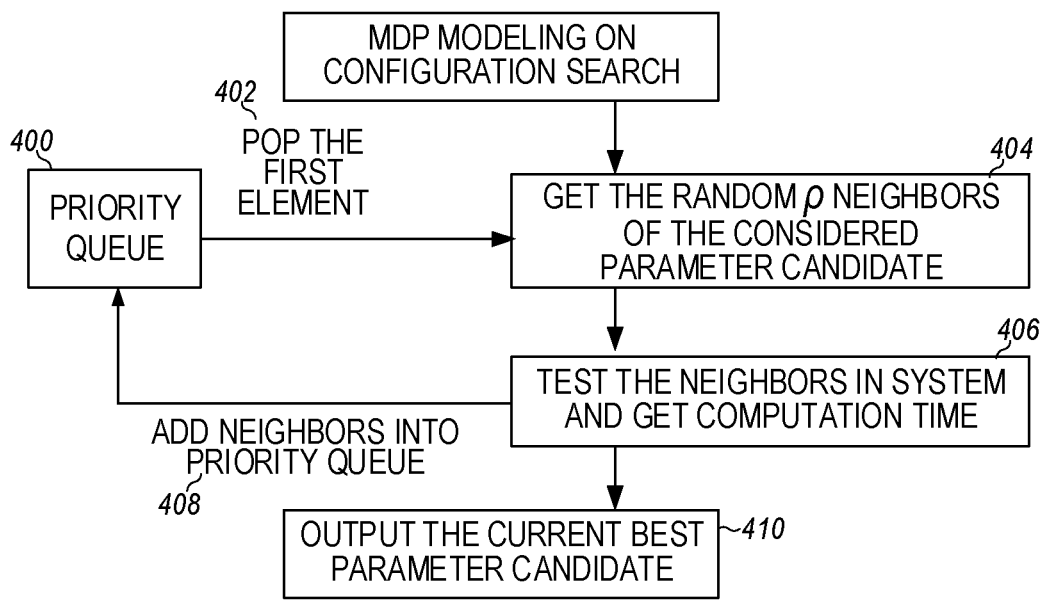
FIG. 4A illustrates a flowchart of the G-BFS method guided by a Greedy Best-First-Search in a sample embodiment.

The G-BFS guided tuning method is guided by a modified Greedy Best-First-Search guided approach and follows the flowchart in FIG. 4A. As illustrated, the method starts with the configuration search model described above and ranks the computation time of all stored states, each time popping the configuration candidate with the lowest computation time. The process starts by initializing an empty priority queue Q 400 (ordered by increasing cost), an empty list $S_v$ to record all visited states, and a random or predetermined starting state $s_o$. The configuration is first tested on target hardware, and the starting state $s_0$ is enqueued and its running time cost($s_o$) is recorded into the priority queue Q 400. The priority queue Q 400 initially contains the initial configuration candidate. While the priority queue Q 400 is not empty, a candidate is popped from the priority queue Q 400 and M random neighbors are explored that can be reached from the candidate. In each iteration, the top configuration candidate s is dequeued from Q 400 at 402, and the system iterates through all actions $a \in A$ and all corresponding neighbor states are collected as:

$$g(s)=[s'=\text{step}(s,a) \forall a \in A] \quad (9)$$

$\rho(\rho \in 1, 2, \ldots, \text{len}(g(s))\})$ states are randomly selected from g(s) at 404 and are tested in hardware at 406 to get the computation time of all explored parameter candidates. For each state s' from g(s), if s' is legitimate and has not been visited before, s' and its running time cost(s') is enqueued into priority queue Q 400 at 408 and states is added in the visited list $S_v$. If its running time cost(s) is smaller than the current minimum running time, state s' is set as the optimal state visited and its running time is recorded in the priority queue Q 400 as $cost_{min}$. The iteration continues until the priority queue Q 400 is empty or the search time reaches the maximum time $T_{max}$ specified by the user. The current optimal state s* and its running time $cost_{min}$ are returned as configuration tuning results at 410. The configuration with the reduced running time may be used to determine the configuration tiling strategy. In this fashion, the G-BFS method does not need to expand to consider all neighboring states or vertices. A summary of the G-BFS algorithm is shown in Algorithm 1 below.

---
Algorithm 1: G-BFS Method
---
1: Initialization: Q = PriorityQueue( ), $S_v$, $s_0$
2: Q.push((cost($s_0$), $s_0$));
3: Add $s_0$ in $S_v$;
4: while Q ≠ ∅ and $t_{search}$ < $T_{max}$ and $Configs_{searched}$ < $p.Configs_{total}$
   do
5:   (cost(s), s) = Q.pop( );
6:   β = Take ρ neighbors randomly from g(s);
7:   for $s^1$ in β do
8:     if $s^1$ is legitimate and $s^1$ not ∈ $S_v$ then
9:       Q.push((cost($s^1$), $s^1$));
10:      Add $s^1$ in $S_v$;
11:      if $cost_{min}$ > cost($s^1$) then
12:        $cost_{min}$ = cost($s^1$);
13:        $s^*$ = $s^1$;
14:      end if
15:     end if
16:   end for
17: end while
18: Return: Configuration $s^*$ with $cost_{min}$.

---

Figure 4B:
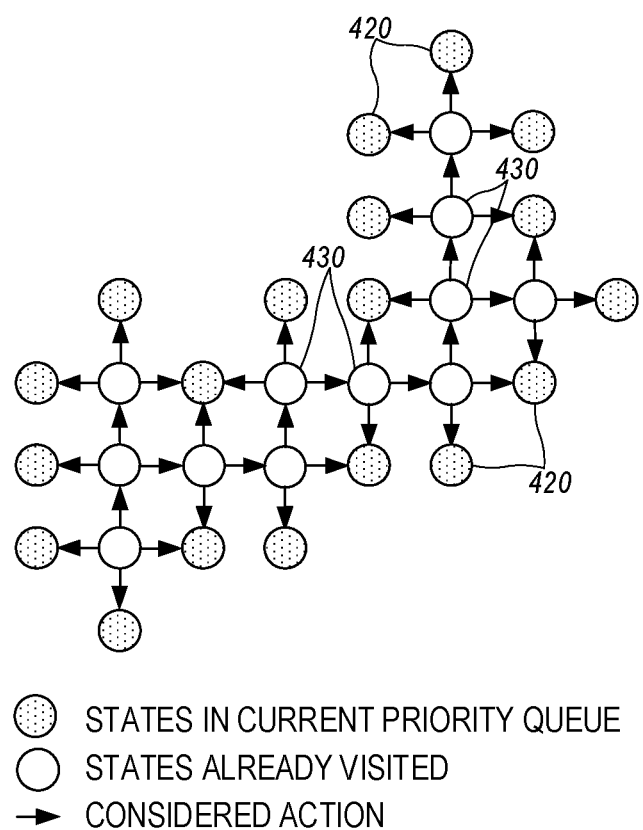
FIG. 4B illustrates the exploration in the middle of the tuning process using the G-BFS method, where the dark outer nodes denote the state currently stored in the priority queue and the light inner nodes are the visited states.

FIG. 4B illustrates the exploration in the middle of the tuning process, where the dark outer nodes 420 denote the state currently stored in the priority queue and the light inner nodes 430 are the visited states. In subsequent iterations, the G-BFS method explores from the p most promising dark outer nodes 420.

Figure 5:
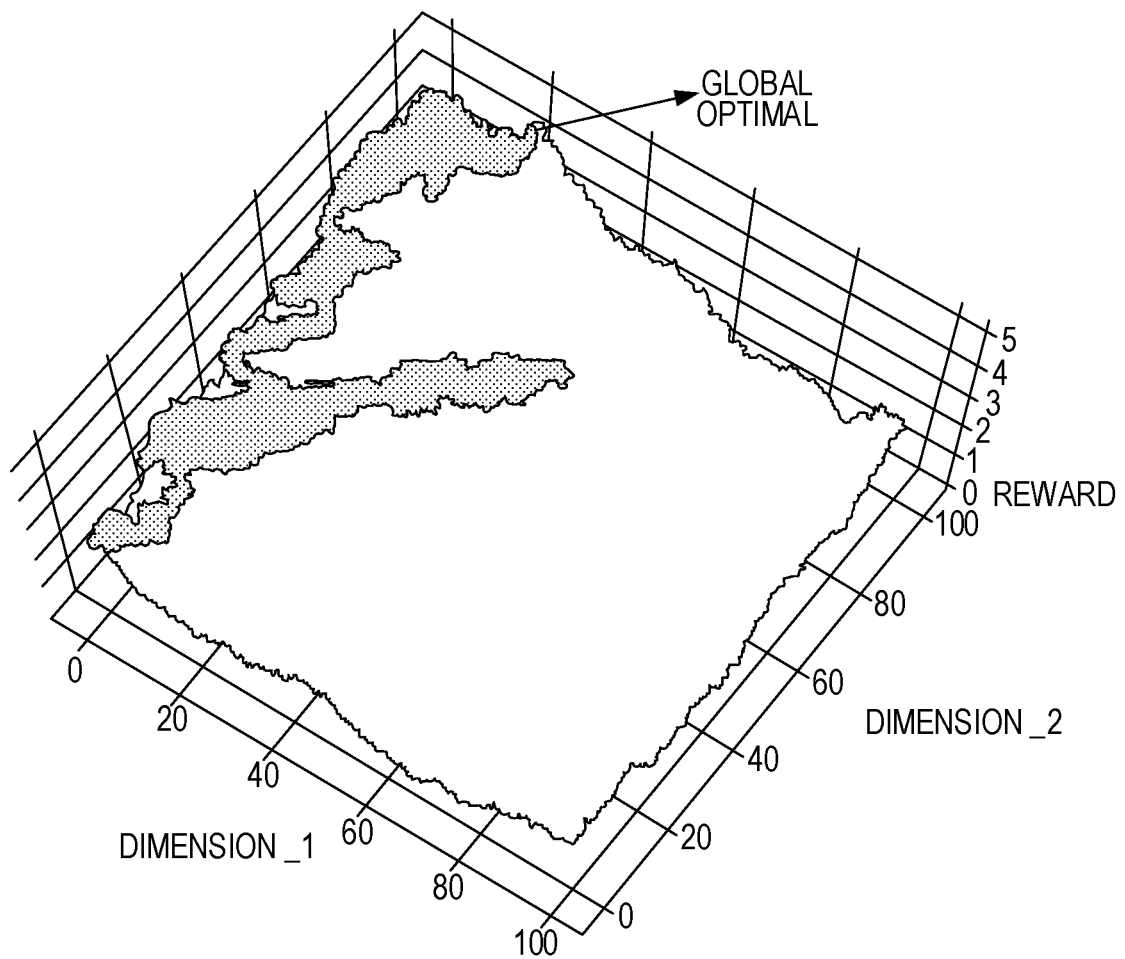
FIG. 5 illustrates an example of a 2-dimensional configuration search with a randomly generated reward function using the G-BFS method.

FIG. 5 illustrates an example of a 2-dimensional configuration sample search trajectory with a randomly generated reward function. The G-BFS method is able to correct itself from exploring wrong directions and efficiently expand its neighborhood to the optimal states. Moreover, when ρ=len (g(s)), given unlimited tuning time, the Algorithm 1 is guaranteed to visit all configuration states.

An advantage of the G-BFS method is that it is a light-weighted algorithm where the priority queue ranks the computation time of all stored states and each time pops the configuration candidate with the lowest computation time. The guidance from the modified greedy best first search model is able to reduce the ratio of the tested parameter candidates from the entire GEMM configuration space and to decrease the probability of testing parameter candidates that require a large computation time. The G-BFS method for parameter tuning thus may significantly reduce the searching time and the ratio of visited configuration candidates for the tuner.

N-A2C Method

Figure 6A:
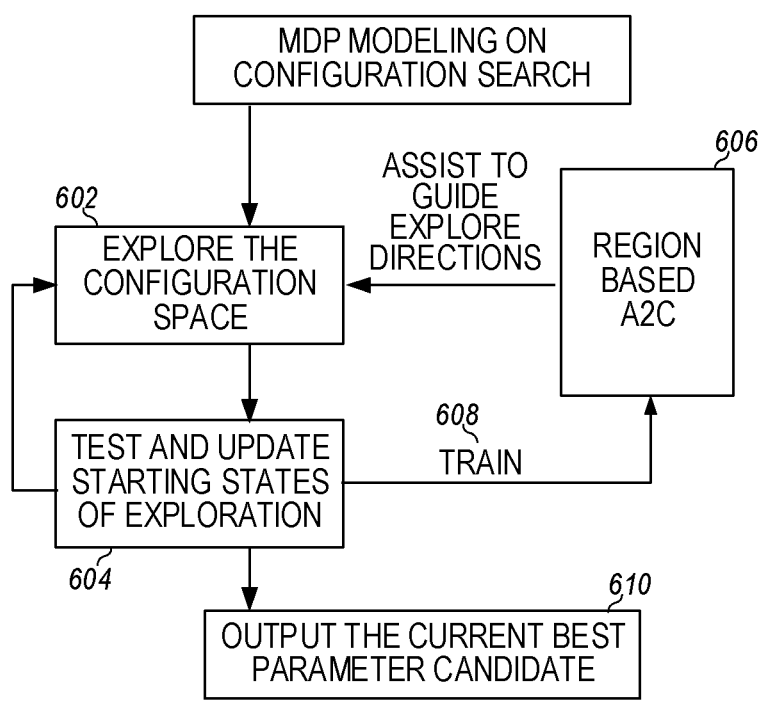
FIG. 6A illustrates a flowchart of the N-A2C method in a sample embodiment.

As the G-BFS method explores only one step from the considered state for each iteration, its performance may be affected when the cost from similar states exhibits large random noise. In the N-A2C method, on the other hand, as shown in FIG. 6A, for each episode, an exploration is performed in a g-step neighborhood, and the direction of exploration is guided by the A2C method (Bhatnagar, et al., "Natural actor-critic algorithms," Automatica, 45(11): 2471-2482 (2009)). The center of the exploration neighborhood is periodically updated with the optimal states ever visited. The N-A2C method thus starts from a starting state and instructs the agent to take action to approach the optimal state for GEMM tiling.

The N-A2C method is summarized in Algorithm 2 below. As illustrated, the method starts with the configuration search model described above. The system initializes a random or hand-crafted starting state so, a fixed-size memory buffer M to record the latest search information, and an empty hashtable Ho to record all visited states with the associated cost. For the A2C model, both actor and critic initialize their neural networks with random initial weights. For each episode, from the same starting point, the agent 600 explores T continuous steps by taking an N-step action-guided walk at 602. For each step, the agent follows the c-greedy algorithm, where with probability of c, the agent takes random action a guided by the policy π(s) generated by the actor's neural network. With a probability of 1−∈, the agent chooses a random action a from the current state and takes an action following the policy output from the neural network of the actor. Based on the current state s and action a, the next state s' is obtained from Eqn. (7). If the next state s' has not been visited before, s' is added into collected candidate set $β_{collect}$. The step is stored as (state, action, reward, next_state). The state with the minimum running time in this episode is chosen as the initial state from the next episode. The process iterates at 604 until the number of collected states reaches the predefined threshold, and the hardware executes the GEMM computation code generated with the collected configuration candidates. The hashmap $H_v$ and memory buffer M are then updated with the configuration candidates and the associated running time at 606. The exploration data stored in M is used to incrementally-train the neural networks of the critic and actor of A2C at 608. The training step is based on the predicted performance (reward) of the critic. In sample embodiments, the training may be transferred to another matrix region or algorithm as appropriate.

---
Algorithm 2: N-A2C Method
---
1:   Initialization: $s_0$, M, $H_v$, $cost_{min}$
2:   for each episode do
3:     while len($β_{collect}$) < len($β_{test}$) do
4:       s = $s_0$;
5:       for each step until T steps do
6:         if rand( ) < ∈ then
7:           a follows π(s);
8:         else
9:           a is randomly selected from A;
10:        end if
11:        s' = step(s, a);
12:        if s' not in $H_v$ then
13:          Add s' in $β_{collect}$;
14:        end if
15:        s = s';
16:       end for
17:     end while
18:     for s' in $β_{collect}$ do
19:       if $cost_{min}$ > cost(s') then
20:         $cost_{min}$ = cost(s');
21:         $s^*$ = s';
22:         $s_0$ = $s^*$;
23:       end if
24:       $H_v$[s'] = cost(s');
25:       Store (s, a, r(s, a), s') to M, where ∀$_s$, ∀$_a$ satisfy step(s,a) = s';
26:       Train actor's and critic's neural networks with M;

Algorithm 2: N-A2C Method

27:     end for
28:   if $t_{search} \geq T_{max}$ or $Configs_{searched} \geq \rho \cdot Configs_{total}$ do
29:     Return: Configuration $s^*$ with $cost_{min}$
30:   end if
31: end for Generally, the N-A2C method may efficiently search the optimal GEMM configuration with fixed exploration steps in each episode. Nevertheless, heuristics can be applied. Just like learning-rate decay in training deep neural networks, the exploration step T can have a decay process, i.e., starting with a large value and gradually reducing to a small number. In addition, the exploration step T can also increase to explore new configuration neighborhoods.

Figure 6B:
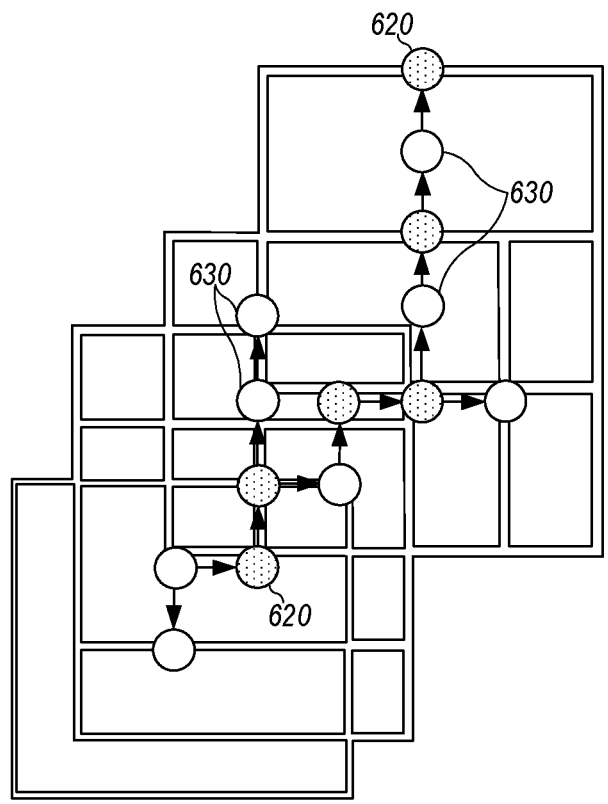
FIG. 6B illustrates a simple exploration map using the N-A2C method and T=2.

FIG. 6B illustrates a simple exploration map using the N-A2C method and T=2. Unlike FIG. 4B, the exploration neighborhood is defined as two steps from the current states. In FIG. 6B, the dark nodes 620 illustrate the states with the lowest running time within the 2-step, while the lighter nodes 630 illustrate the states already visited within the bounded 2-state region.

Figure 7:
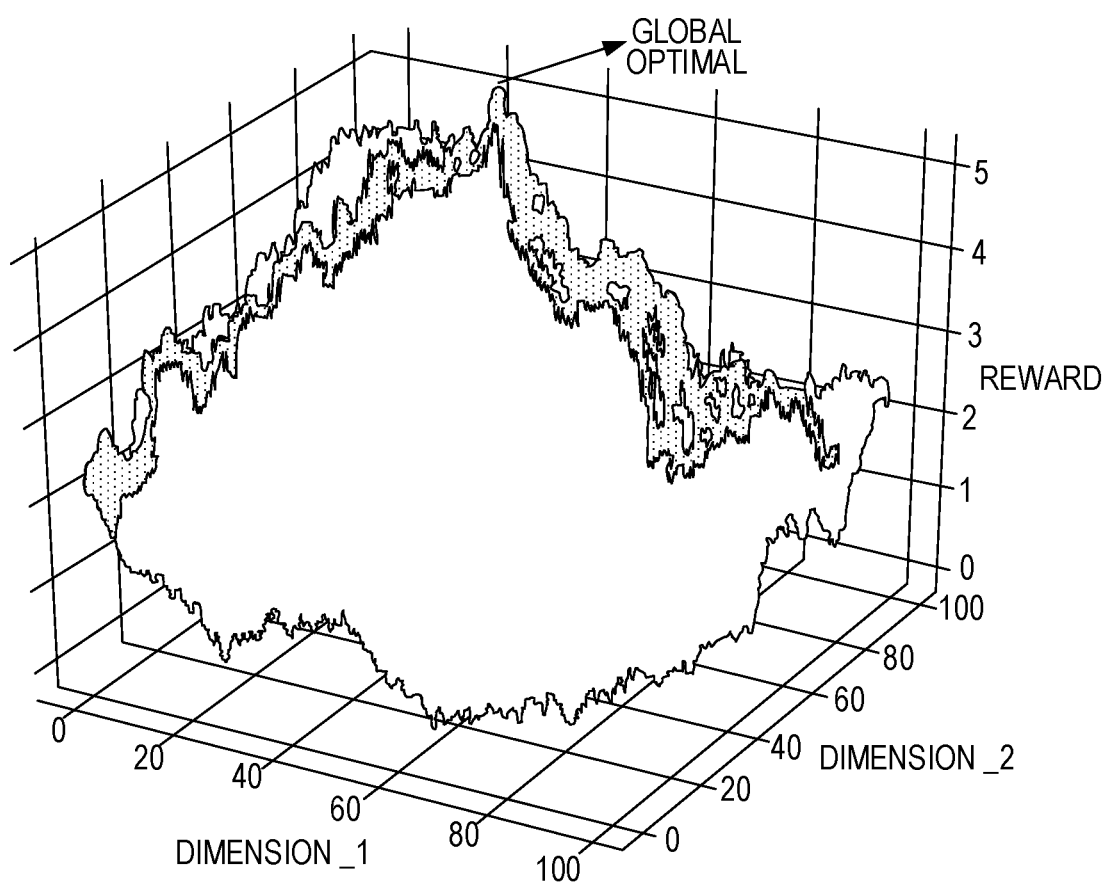
FIG. 7 illustrates an example of a 2-dimensional configuration sample search trajectory with a randomly generated reward function using the N-A2C method.

FIG. 7 illustrates an example of a 2-dimensional configuration sample search trajectory with a randomly generated reward function. Due to the large randomness in the example, the exploration step is set as 100 and the global optimal state is efficiently discovered with the guidance of the N-A2C algorithm.

The guidance from the N-A2C reinforcement learning model is also able to reduce the ratio of the tested parameter candidates from the entire GEMM configuration space and to decrease the probability of testing parameter candidates that require a large computation time. The N-A2C method for parameter tuning thus also may significantly reduce the searching time and the ratio of visited configuration candidates for the tuner.

Experimental Results

The performance of the GEMM configuration tuning approaches have been evaluated on an Nvidia Titan Xp GPU in the TVM framework. Following similar settings in TVM for GPUs, the number of nested loops for each dimension is set as $d_m=4$, $d_k=2$, $d_n=4$. The random selection parameter $\rho=5$ is set for the G-BFS method, and the maximum number of search steps T=3 is set for the N-A2C method. Without losing generality, the initial state is set for both methods as $s_0=[[m, 1, 1, 1], [k, 1], [n, 1, 1, 1]]$, which represents the configuration without multi-level matrix tiling. The performance of the configuration tuning methods can be further improved by setting the initial state to a more meaningful configuration. In order to investigate the performance of the configuration search methods, the methods are compared with state-of-the-art algorithms including the XGBoost method in the TVM framework and the general configuration optimization method using a RNN controller by Google researchers. Unless otherwise specified, the computation time for each configuration is the arithmetic mean for 10 repeated trials on the tested GPU hardware.

Without losing their applicability to deep learning, the four approaches were evaluated on a perceptron network, which is the fundamental building block for state-of-the-art neural network architectures while mainly including GEMM for computation. The computation in the perceptron network is denoted as $Y=W^T X$, where $W \in \mathbb{R}^{(k,m)}$, $X \in \mathbb{R}^{(k,n)}$, and $Y \in \mathbb{R}^{(m,n)}$; n is the batch size, k is the input dimension, and m is the output dimension. Accordingly, the size of perceptron network is denoted in the format of (m, k, n), which corresponds to matrices A(m×k) and B(k×n) for GEMM.

Figure 8A:
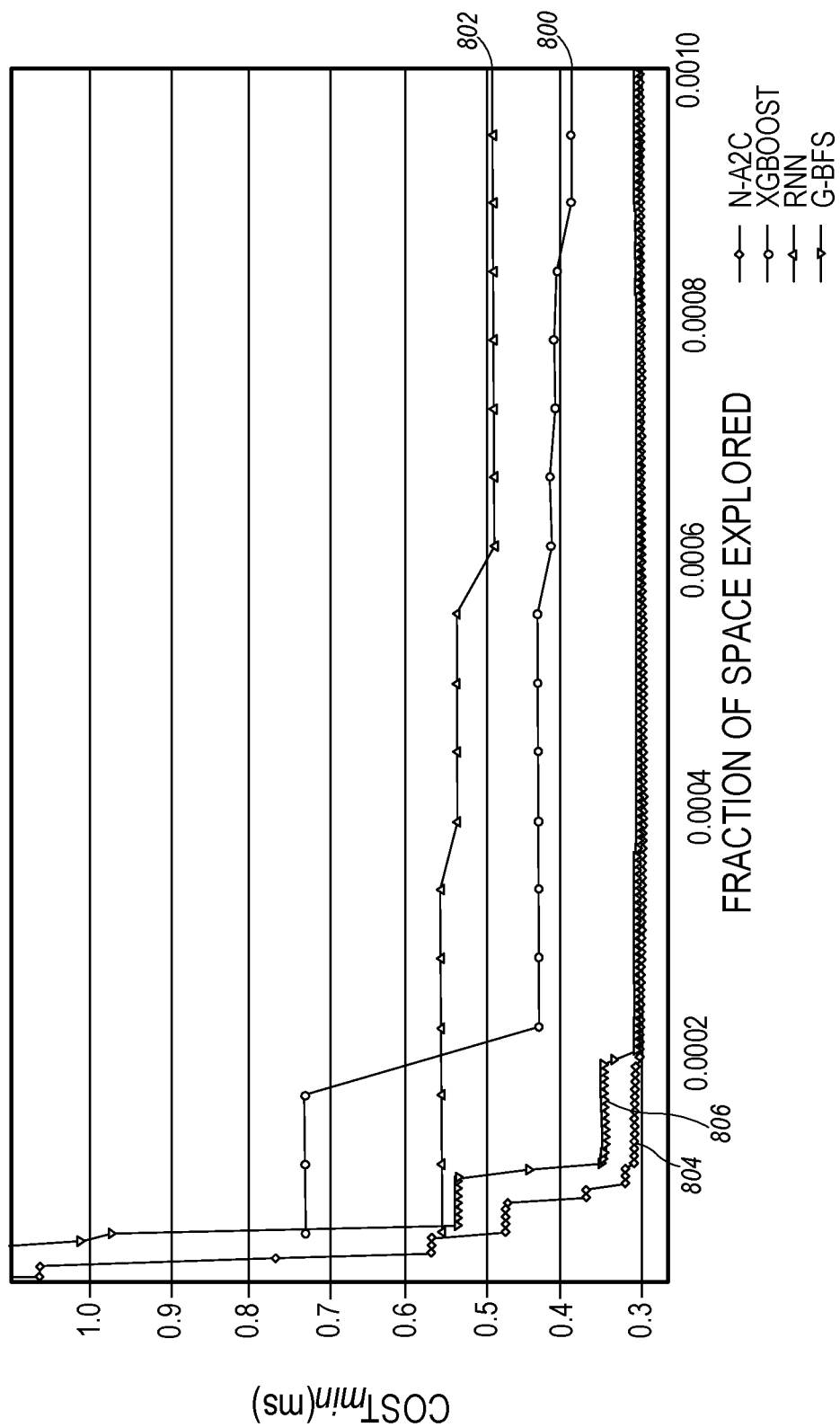
FIG. 8A illustrates a graph of the optimal computation time discovered with respect to the fraction of visited configurations.
Figure 8B:
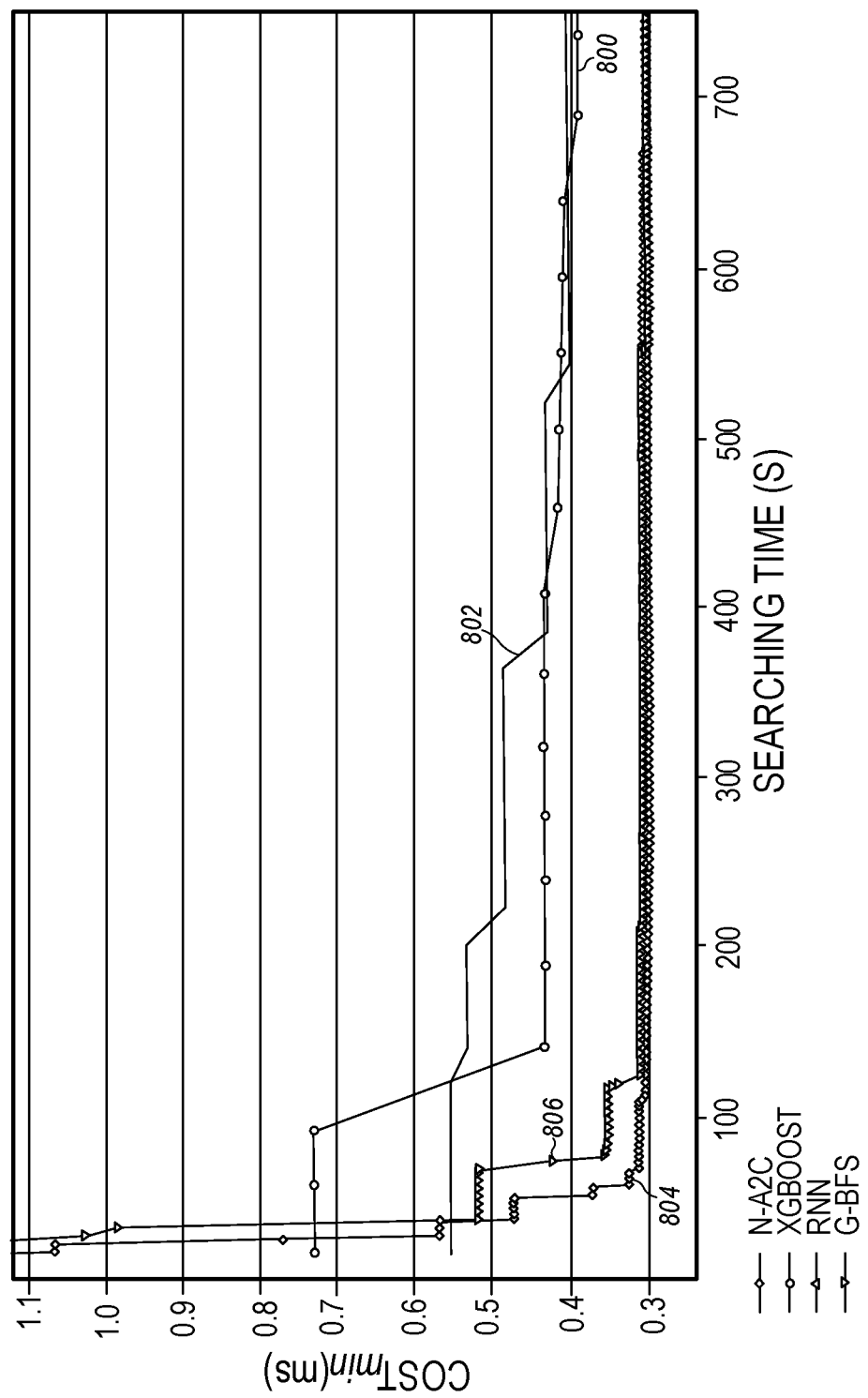
FIG. 8B illustrates a plot of the optimal cost discovered by the G-BFS, N-A2C, XGBoost, and RNN methods over time.

In FIG. 8A and FIG. 8B, the input dimension is set as 1024, batch size as 1024, and output dimension as 1024. The optimal computation time with respect to the fraction of visited configurations is first evaluated in FIG. 8A. Based on the sizes of matrices and the number of nested loops, there are 899756 configuration candidates. With increasing fraction of visited configurations, the optimal cost in terms of hardware computation time generally decreases. Compared with the XGBoost method 800 and RNN method 802, the N-A2C method 804 and G-BFS method 806 are able to discover the better configurations with a lower fraction of visited configuration candidates. FIG. 8B plots the optimal cost discovered by the four methods over time. As illustrated, it generally takes the N-A2C method 804 and G-BFS method 806 less time to find the configuration with lower cost as compared with the XGBoost method 800 and RNN method 802.

Figure 9A:
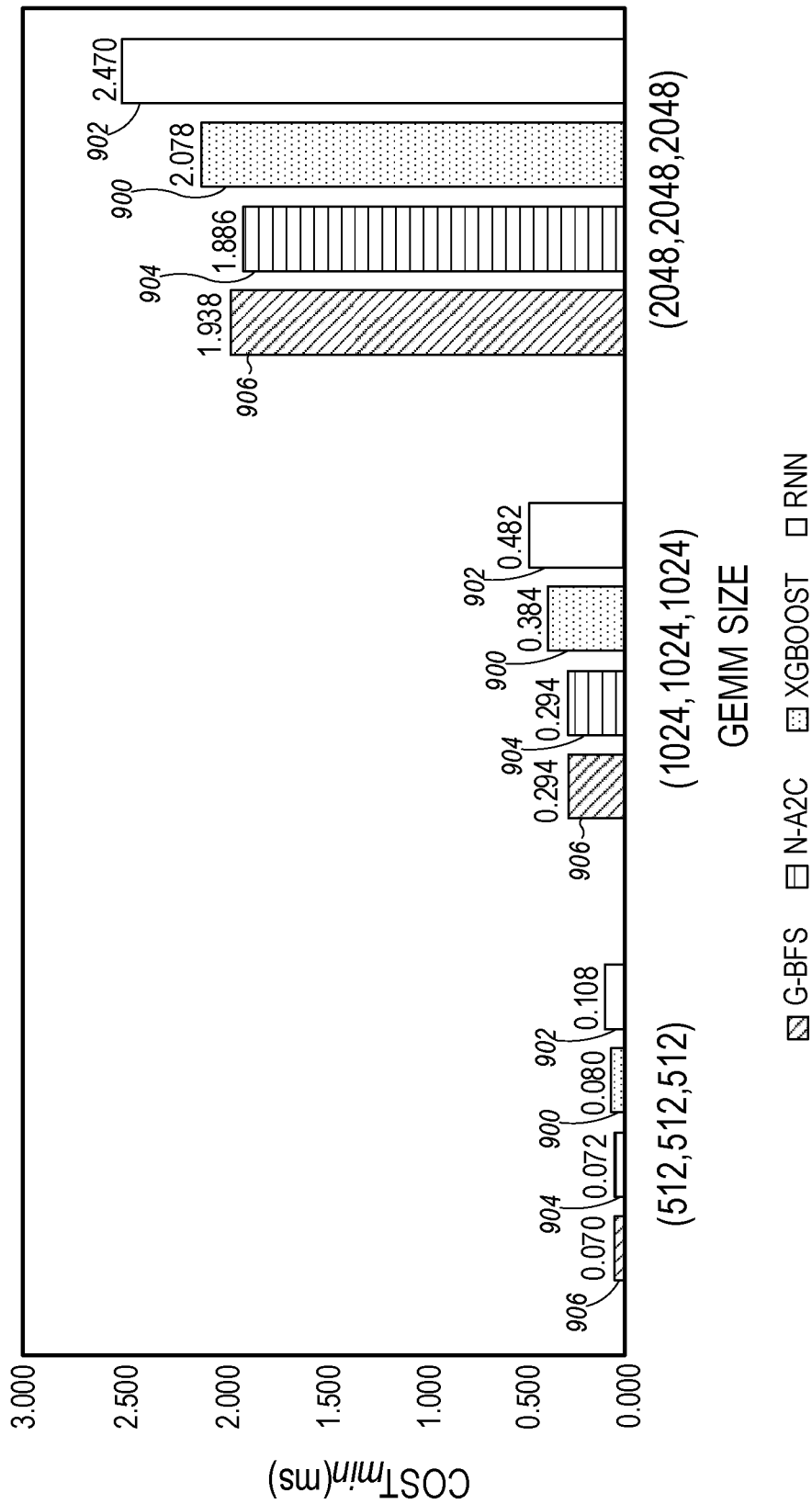
FIG. 9A illustrates a graph comparing the discovered optimal computation time when the fraction of visited configuration candidates reaches 0.1%.
Figure 9B:
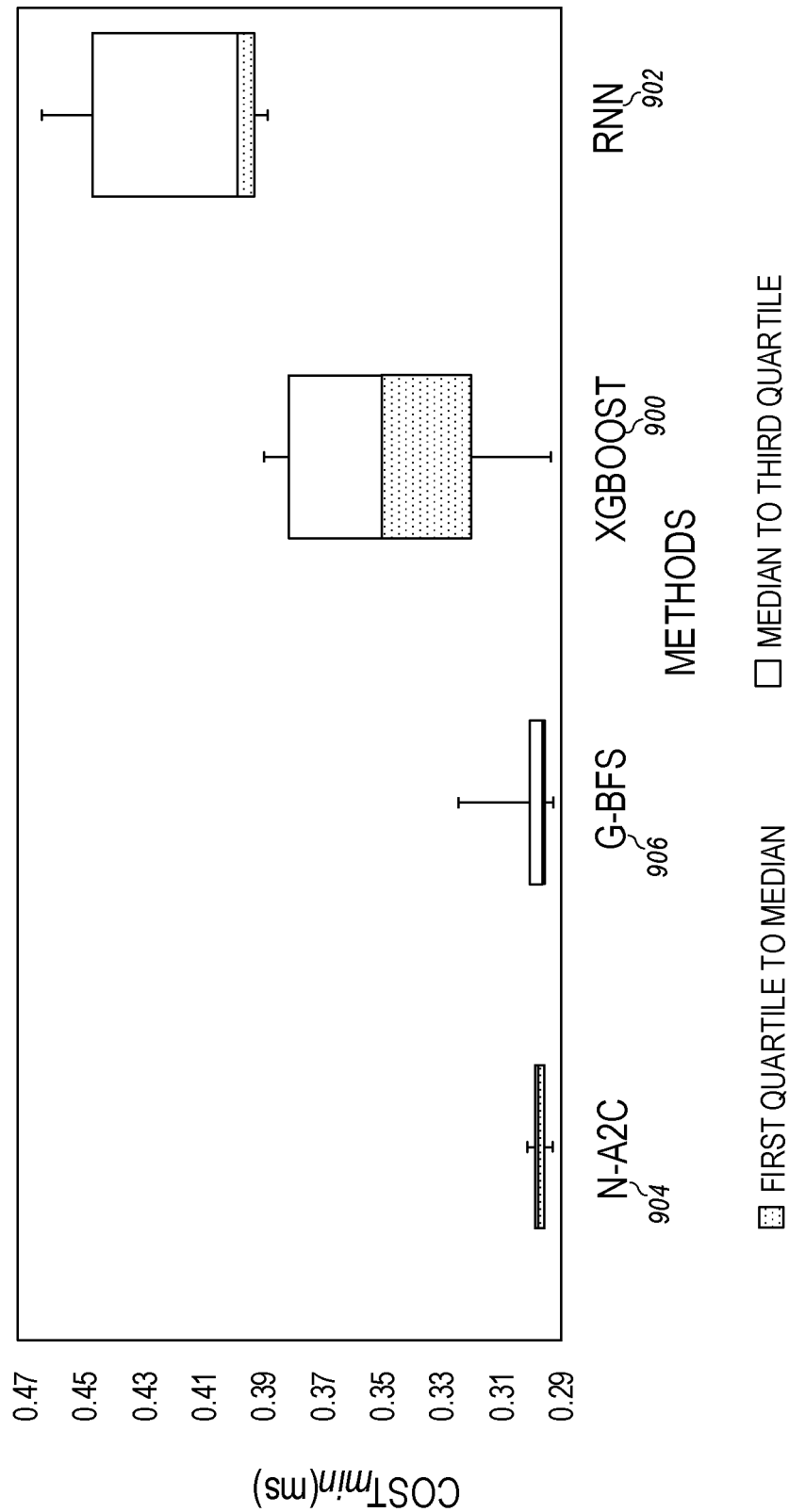
FIG. 9B illustrates a box plot comparing the cost of best configuration discovered when the tuning time is limited to about 750 seconds.

FIGS. 9A-9B illustrate evaluation and comparison of the configuration tuning efficiency in the perceptron network. FIG. 9A compares the discovered optimal computation time when the fraction of visited configuration candidates reaches 0.1% for the different methods (G-BFS, N-A2C, XGBoost, RNN). The total numbers of configuration candidates for (512, 512, 512), (1024, 1024, 1024), (2048, 2048, 2048) matrix tiling are 484000, 899756, and 1589952, respectively. As the sizes of matrices increase, longer computation time is required, and G-BFS 906 and N-A2C 904 can search the configuration more efficiently than the XGBoost method 900 and RNN method 902. Specifically, with 0.1% exploration of (1024, 1024, 1024)'s configuration space, the G-BFS method 906 and N-A2C method 904 are able to discover configurations with 24% lower cost (computation time) than what the XGBoost method 900 can find and configurations of 40% lower cost than what the RNN method 902 can find. The N-A2C method 904 outperforms the G-BFS method 906 for larger matrix sizes (e.g., (2048, 2048, 2048)), as the N-A2C method 904 is able to go multiple steps from the current state.

FIG. 9B compares the cost of a best configuration for the different methods (G-BFS, N-A2C, XGBoost, RNN) discovered when the tuning time is limited to about 750 seconds. In order to show the variance of performance incurred by random exploration for each method, a box plot is used with the minimum, first quartile, median, mean, third quartile, and maximum values for 10 trials on the (1024, 1024, 1024) tiling. As illustrated, the G-BFS method 906 and N-A2C method 904 not only achieve better mean and median results, but also exhibit more stable behaviors (less variance) than the XGBoost method 900 and the RNN method 902.

A Greedy Best First Search (G-BFS) method and a Neighborhood Actor Advantage Critic (N-A2C) method have been described for compiler-level GEMM optimization that take advantage of the performance of neighborhood configurations. The G-BFS method outperforms the XGBoost and RNN methods consistently, and the N-A2C method performs even better for large matrices. Empirical results show that both methods achieve significant performance improvement over state-of-the-art configuration tuning methods such as those using XGBoost and the RNN controller. Both methods are general in the sense that they are applicable to other compiler-level tuning tasks and can be used for optimization of other tensor operators with a large configuration space.

Also, the G-BFS method and the N-A2C method provide an efficient balancing between exploration and exploitation. While the prior art XGBoost system always starts the random walk for exploration at a fixed or random point with a totally random walk over a large exploration space, the G-BFS method and the N-A2C method each consider a parameter candidate where the exploration is limited to its neighbors. The number of random selections of the neighbors affects the speed to find an optimal configuration parameter or parameters. Since the value of the random selection number is small, it is suitable for a dataset with many local optimal solutions where the method is able to quickly bypass the local optimal solution and find the optimal solution. Also, a large value of the random selection number is suitable for a convex dataset where the closest path to the optimal solution may be found quickly.

Neural Networks

In some of the above steps, neural networks are established for an actor and for a critic in the N-A2C method with random initial weights. The following paragraphs provide an overview of the use and operation of such neural networks.

Artificial intelligence (AI) is a field concerned with developing decision-making systems to perform cognitive tasks that have traditionally required a living actor, such as a person. Artificial neural networks (ANNs) are computational structures that are loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers do not generally know which weights will work for a given application. Instead, a training process is used to arrive at appropriate weights. ANN designers typically choose a number of neuron layers or specific connections between layers including circular connection, but the ANN designer does not generally know which weights will work for a given application. Instead, a training process generally proceeds by selecting initial weights, which may be randomly selected. Training data is fed into the ANN and results are compared to an objective function that provides an indication of error. The error indication is a measure of how wrong the ANN's result was, compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the ANN-here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs. Any well-known optimization algorithm for back propagation may be used, such as SGD, Adam, etc.

Figure 10:
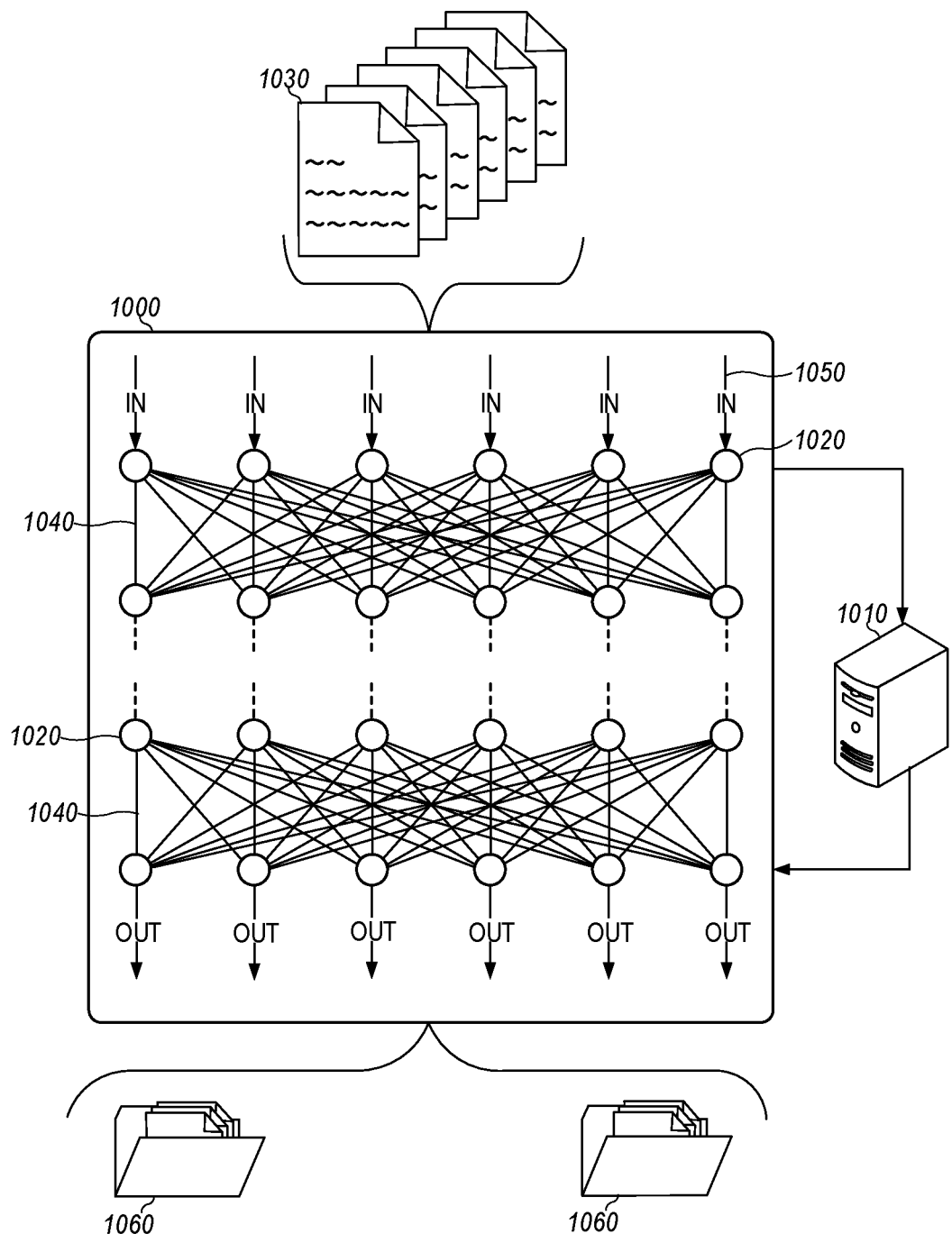
FIG. 10 is a block diagram of an example of an environment including a system for neural network training.

FIG. 10 is a block diagram of an example of an environment including a system for neural network training. The system includes an ANN 1000 that is trained using a processing node 1010. ANN 1000 may be implemented as a module and used in conjunction with the combined reward functions. Example modules include convolutional neural networks (CNN) and other types of networks such as ResNet, a type of network that uses residual functions, as well as any other type of network that may be adapted to utilize reward functions. Such neural networks may consist of one or more layers of neurons or synapses in various embodiments. The number of layers may depend on the type of network selected. ResNet may have 50 layers, for example, while other networks may have from a few to a thousand or more. Other CNN structures that may be used include but are not limited to VGG, Inception, and Exception.

The processing node 1010 may be a CPU, GPU, field programmable gate array (FPGA), digital signal processor (DSP), application specific integrated circuit (ASIC), or other processing circuitry. In an example, multiple processing nodes may be employed to train different layers of the ANN 1000, or even different nodes 1020 within layers. Thus, a set of processing nodes 1010 may be arranged to perform the training of the ANN 1000.

The set of processing nodes 1010 is arranged to receive a training set 1030 for the ANN 1000. The ANN 1000 comprises a set of nodes 1020 arranged in layers (illustrated as rows of nodes 1020) and a set of inter-node weights 1040 (e.g., parameters) between nodes in the set of nodes 1020. In an example, the training set 1030 is a subset of a complete training set. Here, the subset may enable processing nodes 1020 with limited storage resources to participate in training the ANN 1000.

The training data may include multiple numerical values representative of a domain, such as red, green, and blue pixel values and intensity values for an image or pitch and volume values at discrete times for speech recognition. Each value of the training, or input 1050 to be classified once ANN 1000 is trained, is provided to a corresponding node 1020 in the first layer or input layer of ANN 1000. The values propagate through the layers and are changed by the objective function.

As noted above, the set of processing nodes 1020 is arranged to train the neural network to create a trained neural network. Once trained, data input into the ANN 1000 will produce valid classifications 1060 (e.g., the input data 1050 will be assigned into categories), for example. The training performed by the set of processing nodes 1020 is iterative. In an example, each iteration of the training of the neural network is performed independently between layers of the ANN 1000. Thus, two distinct layers may be processed in parallel by different members of the set of processing nodes 1010. In an example, different layers of the ANN 1000 are trained on different hardware.

ANN 1000 may calculate one or more neuron or synapse weights 1040 for criteria based upon one or more machine learning algorithms. During training, historical action information representing past actions may be labeled with an indication of whether the decision made was ultimately successful, in this case, the reward. Thus, the reward, which is based on both robot navigation and the ability to track the object, is used to update the network weights 1040. Note that in various networks, initial weights may be pre-set. In other networks, initial weights may be randomized. In one embodiment, a module or processor executing computer instructions to effectuate the neural network learning operations modifies a source neuron's output with a synapse weight to determine the contribution of the source neuron to cause the sink neuron to fire. Practically, in this embodiment, a single and modified value is integrated at the sink neuron in response to the source neuron activation.

Computer Architecture

Figure 11:
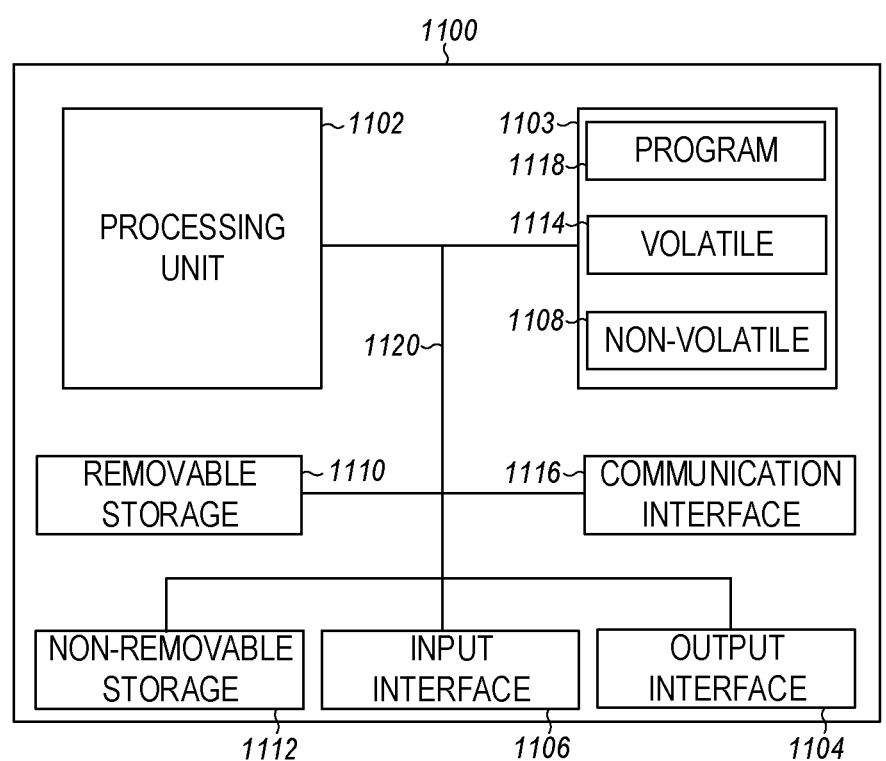
FIG. 11 is a block diagram illustrating circuitry for clients, servers, cloud-based resources, and other computer resources for implementing algorithms and performing methods according to sample embodiments.

FIG. 11 is a block diagram of an example computing device for performing methods according to example embodiments. All components need not be used in various embodiments. The computing device may be implemented in any of a number of components including, for example, a compiler and a neural network controller.

One example computing device in the form of a computer 1100 may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, or other computing device including the same or similar elements as illustrated and described with regard to FIG. 11. Devices, such as smartphones, tablets, and smartwatches, are generally collectively referred to as mobile devices or user equipment. Further, although the various data storage elements are illustrated as part of the computer 1100, the storage may also or alternatively include cloud-based storage accessible via a network, such as the Internet or server-based storage.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1100 may include or have access to a computing environment that includes input interface 1106, output interface 1104, and a communication interface 1116. Output interface 1104 may include a display device, such as a touchscreen, that also may serve as an input device. The input interface 1106 may include one or more of a touchscreen, touchpad, mouse, keyboard, camera, one or more device-specific buttons, one or more sensors integrated within or coupled via wired or wireless data connections to the computer 1100, and other input devices.

The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, Wi-Fi, Bluetooth, or other networks. According to one embodiment, the various components of computer 1100 are connected with a system bus 1120.

Computer-readable instructions stored on a computer-readable medium are executable by the processing unit 1102 of the computer 1100, such as a program 1118. The program 1118 in some embodiments comprises software that, when executed by the processing unit 1102, performs operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1118 may be used to cause processing unit 1102 to perform one or more methods or algorithms such as the G-BFS and N-A2C algorithms described herein.

In an example embodiment, the computing device 1100 is configured to optimize general matrix multiplication (GEMM) on target hardware. The computing device 1100 includes at least one processor 1102 and a machine-readable medium 1103 coupled to the at least one processor 1102. The machine-readable medium includes instructions 1118 thereon that, when executed by the at least one processor 1102, causes the at least one processor 1102 to implement a tiling module, an optimizer module, and an execution module. The tiling module includes software that splits matrices to be multiplied into respective tiles and the optimizer module includes software that formulates an optimal tiling configuration for the matrices to be multiplied that collectively achieves a lowest running time for multiplication of the matrices on the target hardware into the following optimization problem, $$\min_{s} \text{cost}(s; m, k, n, d_m, d_k, d_n),$$

where s denotes a configuration state, cost denotes a running time for the configuration state s, m, k, and n are matrix parameters for multiplication of a first matrix A (m×k) by a second matrix B (k×n), to produce a matrix C (m×n), where m is a number of rows of a first matrix, k is number of columns of the first matrix and number of rows of a second matrix, and n is the number of columns of the second matrix, and $d_m$, $d_k$, $d_n$ are numbers of respective nested loops for each dimension m, k, and n, respectively. The optimal tiling configuration for the matrices to be multiplied is the tiling configuration that optimizes the running time for multiplication of the matrices on the target hardware. The computer 1100 further implements an execution module that runs a computation on the target hardware based on the optimal tiling configuration. In some embodiments, the computer 1100 may include other or additional modules for performing any one of or combination of steps described in the embodiments. Further, any of the additional or alternative embodiments or aspects of the method, as shown in any of the figures or recited in any of the claims, are also contemplated to include similar modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method of optimizing general matrix multiplication (GEMM) on target hardware, the method comprising:
   splitting, by one or more processing devices, matrices to be multiplied into tiles;
   formulating, by the one or more processing devices, a tiling configuration search problem for the matrices to be multiplied that explores a configuration search space to identify an optimal tiling configuration that minimizes a running time on the target hardware for multiplication of the matrices on the target hardware, the formulating including formulating the tiling configuration search problem into following optimization problem:
   min cost (s; m, k, n, $d_m$, $d_k$, $d_n$),
   s
   where:
   s denotes a configuration state,
      wherein the configuration state s is defined as s=[$s_m$ $s_k$, $s_n$, J], where $s_m$=[$m_0$, $m_1$, ... , $m_{dm-1}$], $s_k$=[$k_0$, $k_1$, ..., $k_{dk-1}$], $s_n$=[$n_0$, $n_1$, ..., $n_{dn-1}$], and J is a binary number indicating whether the configuration state s satisfies search constraints for searching tiling configurations on the matrices,
      wherein an action space for exploring from a current state s[i,j] to another state is defined such that s[i]=s[i]*2 and s[j]=s[j]/2 where i and j are in the same split of m defined as from dimension 0 to dimension $d_m$−1, k defined from dimension $d_m$ to dimension $d_m$+$d_n$−1, or n defined from dimension $d_m$+$d_n$ to dimension $d_m$+$d_n$+$d_k$−1,
      wherein each configuration state s is a unique state and a transition from one configuration state to another is defined as s'=step (s, a), where a is a particular action that transitions a current state s to state s', further comprising defining a reward function for the optimization problem as:

$$r(s,a)=1,$$

$$cost(s',m,k,n,d_m,d_k,d_n)$$

where for each configuration state s' which can be accessed by any possible action a from one configuration state s, the state s' and the state s are neighbor states,
   cost denotes a running time for the configuration state s, m, k, and n are matrix parameters for multiplication of a first matrix A (m×k) by a second matrix B (k×n), to produce a matrix C (m×n), where m is a number of rows of a first matrix, k is number of columns of the first matrix and number of rows of a second matrix, and n is the number of columns of the second matrix, and $d_m$, $d_k$, $d_n$ are numbers of respective nested loops for each dimension m, k, and n, respectively; and
   running, by the one or more processing device, a GEMM computation on the target hardware based on the optimal tiling configuration.

2. The computer-implemented method as in claim 1, wherein the configuration search space for the optimal tiling configuration is limited by $d_m$, $d_k$, and $d_n$, where dm is restricted to $2^x$, $d_k$ is restricted to $2^y$, and $d_n$ is restricted to $2^z$, where x, y, and z are non-negative integers.

3. The computer-implemented method as in claim 1, wherein selecting the optimal tiling configuration for the matrices to be multiplied that optimizes the running time for multiplication of the matrices on the target hardware comprises implementing a Greedy Best-First-Search (GBFS) algorithm to search for an optimal tiling configuration starting at a random starting state so or a selected starting state $s_0$ to run respective configurations on the target hardware to find an optimal state s' with a minimum cost within one of a predetermined search time and a predetermined fraction of the configuration search space for the GBFS algorithm.

4. The computer-implemented method as in claim 3, wherein the configuration search space is defined for the optimal tiling configuration for a random subset of neighbors p of the configuration state s where 1≤p≤total number of neighbors of s and the neighbor state s' for s in response to action a is s'=step (s, a).

5. The computer-implemented method as in claim 1, wherein selecting the optimal tiling configuration for the matrices to be multiplied that optimizes the running time for multiplication of the matrices on the target hardware comprises implementing a Neighborhood Actor Advantage Critic (N-A2C) algorithm to search for an optimal tiling configuration starting at a random or selected starting state so to run respective configurations on the target hardware to find an optimal state s' with a minimum cost within one of a predetermined search time and a predetermined fraction of the configuration search space.

6. The computer-implemented method as in claim 5, wherein neural networks of an actor and critic in the N-A2C algorithm are initialized with random weights and, for each episode of the N-A2C algorithm, the configuration search space is searched for the optimal tiling configuration from the starting state $s_0$ in T continuous steps using an ε—greedy algorithm for each step, where (1) with a probability of ε an action a guided by a policy generated by the actor's neural network for each state s is taken to get a next configuration state s' or (2) with a probability of 1−ε a random action a is chosen from a current configuration state s to get a next configuration state s'.

7. The computer-implemented method as in claim 6, wherein when the configuration state s' has not been visited before, the state s' is added to a collected candidate set and the T continuous steps are repeated until a number of collected states s' in the collected candidate set reaches a predefined threshold.

8. The computer-implemented method as in claim 6, wherein the number of the T continuous steps decays in value over iterations of exploration of the configuration search space.

9. A computing device for optimizing general matrix multiplication (GEMM) on target hardware, comprising:
at least one processor; and
a machine-readable medium coupled to the at least one processor, with the machine-readable medium comprising instructions thereon that, when executed by the at least one processor, causes the at least one processor to perform operations including:
splitting matrices to be multiplied into tiles;
formulating a tiling configuration search problem for the matrices to be multiplied that explores a configuration search space to identify an optimal tiling configuration that minimizes a running time on the target hardware for multiplication of the matrices on the target hardware, the formulating including formulating the tiling configuration search problem into following optimization problem:
min cost (s; m, k, n, $d_m$, $d_k$, $d_n$),
s
where:
s denotes a configuration state,
wherein the configuration state s is defined as s=[$s_m$, $s_k$, $s_n$, J], where $s_m$=[$m_0$, $m_1$, . . . , $m_{dm-1}$], $s_k$=[$k_0$, $k_1$, . . . , $k_{dk-1}$], $s_n$=[$n_0$, $n_1$, . . . , $n_{dn-1}$], and J is a binary number indicating whether the configuration state s satisfies search constraints for searching tiling configurations on the matrices,
wherein an action space for exploring from a current state s[i,j] to another state is defined such that s[i]=s[i]*2 and s[j]=s[j]/2 where i and j are in the same split of m defined as from dimension 0 to dimension $d_m$−1, k defined from dimension $d_m$ to dimension $d_m$+$d_n$−1, or n defined from dimension $d_m$+$d_n$ to dimension $d_m$+$d_n$+$d_k$−1,
wherein each configuration state s is a unique state and a transition from one configuration state to another is defined as s'=step (s, a), where a is a particular action that transitions a current state s to state s', further comprising defining a reward function for the optimization problem as:

$r(s,a)=1,$ $cost(s',m,k,n,d_m,d_k,d_n)$ where for each configuration state s' which can be accessed by any possible action a from one configuration state s, the state s' and the state s are neighbor states,
cost denotes a running time for the configuration state s, m, k, and n are matrix parameters for multiplication of a first matrix A (m×k) by a second matrix B (k×n), to produce a matrix C (m×n), where m is a number of rows of a first matrix, k is number of columns of the first matrix and number of rows of a second matrix, and n is the number of columns of the second matrix, and $d_m$, $d_k$, $d_n$ are numbers of respective nested loops for each dimension m, k, and n, respectively; and
running a GEMM computation on the target hardware based on the optimal tiling configuration.

10. The device as in claim 9, wherein the instructions further comprise instructions that when executed by the at least one processor limit the configuration search space for the optimal tiling configuration by $d_m$, $d_k$, and $d_n$, where $d_m$ is restricted to $2^x$, $d_k$ is restricted to $2^y$, and $d_n$ is restricted to $2^z$, where x, y, and z are non-negative integers.

11. The device as in claim 9, wherein the instructions further comprise instructions that when executed by the at least one processor select the optimal tiling configuration for the matrices to be multiplied that optimizes the running time for multiplication of the matrices on the target hardware by implementing a Greedy Best-First-Search (GBFS) algorithm to search for an optimal tiling configuration starting at a random starting state so or a selected starting state so to run respective configurations on the target hardware to find an optimal state s' with a minimum cost within one of a predetermined search time and a predetermined fraction of the configuration search space for the GBFS algorithm.

12. The device as in claim 11, wherein the instructions further comprise instructions that when executed by the at least one processor define the configuration search space for the optimal tiling configuration for a random subset of neighbors p of the configuration state s where 1≤p≤total number of neighbors of s and the neighbor state s' for s in response to action a is s'=step (s, a).

13. The device as in claim 9, wherein the instructions further comprise instructions that when executed by the at least one processor select the optimal tiling configuration for the matrices to be multiplied that optimizes the running time for multiplication of the matrices on the target hardware by implementing a Neighborhood Actor Advantage Critic (N-A2C) algorithm to search for an optimal tiling configuration starting at a random or selected starting state so to run respective configurations on the target hardware to find an optimal state s' with a minimum cost within one of a predetermined search time and a predetermined fraction of the configuration search space.

14. The device as in claim 13, wherein the instructions further comprise instructions that when executed by the at least one processor initialize neural networks of an actor and critic in the N-A2C algorithm with random weights and, for each episode of the N-A2C algorithm, search the configuration search space for the optimal tiling configuration from the starting state $s_0$ in T continuous steps using an ε—greedy algorithm for each step, where (1) with a probability of ε an action a guided by a policy generated by the actor's neural network for each state s is taken to get a next configuration state s' or (2) with a probability of 1−ε a random action a is chosen from a current configuration state s to get a next configuration state s'.

15. The device as in claim 14, wherein the instructions further comprise instructions that when executed by the at least one processor add the state s' to a collected candidate set and repeat the T continuous steps until a number of collected states s' in the collected candidate set reaches a predefined threshold when the configuration state s' has not been visited before.

16. The device as in claim 14, wherein the instructions further comprise instructions that when executed by the at least one processor cause the number of the T continuous steps to decay in value over iterations of exploration of the configuration search space.

17. A computing device for optimizing general matrix multiplication (GEMM) on target hardware, comprising:
at least one processor;
a tiling module splitting matrices to be multiplied into tiles;
an optimization module formulating a tiling configuration search problem for the matrices to be multiplied that explores a configuration search space to identify an optimal tiling configuration that minimizes a running time on the target hardware for multiplication of the matrices on the target hardware, the formulating including formulating the tiling configuration search problem into the following optimization problem:

$$\min_{s} \text{cost}(s; m, k, n, d_m, d_k, d_n),$$

where:
s denotes a configuration state,
wherein the configuration state s is defined as $s=[s_m, s_k, s_n, J]$, where $s_m=[m_0, m_1, \ldots, m_{dm-1}]$, $s_k=[k_0, k_1, \ldots, k_{dk-1}]$, $s_n=[n_0, n_1, \ldots, n_{dn-1}]$, and J is a binary number indicating whether the configuration state s satisfies search constraints for searching tiling configurations on the matrices,
wherein an action space for exploring from a current state s[i,j] to another state is defined such that s[i]=s[i]*2 and s[j]=s[j]/2 where i and j are in the same split of m defined as from dimension 0 to dimension $d_m-1$, k defined from dimension $d_m$ to dimension $d_m+d_n-1$, or n defined from dimension $d_m+d_n$ to dimension $d_m+d_n+d_k-1$,
wherein each configuration state s is a unique state and a transition from one configuration state to another is defined as s'=step (s, a), where a is a particular action that transitions a current state s to state s', further comprising defining a reward function for the optimization problem as:

$$r(s,a)=1,$$

$$\text{cost}(s',m,k,n,d_m,d_k,d_n)$$

where for each configuration state s' which can be accessed by any possible action a from one configuration state s, the state s' and the state s are neighbor states,
cost denotes a running time for the configuration state s,
m, k, and n are matrix parameters for multiplication of a first matrix A (m×k) by a second matrix B (k×n), to produce a matrix C (m×n), where m is a number of rows of a first matrix, k is number of columns of the first matrix and number of rows of a second matrix, and n is the number of columns of the second matrix, and
$d_m$, $d_k$, $d_n$ are numbers of respective nested loops for each dimension m, k, and n, respectively; and
an execution module running a GEMM computation on the target hardware based on the optimal tiling configuration.

* * * * *

UNITED STATES PATENT AND TRADEMARK OFFICE
CERTIFICATE OF CORRECTION

PATENT NO. : 11,842,178 B2
APPLICATION NO. : 17/182753
DATED : December 12, 2023
INVENTOR(S) : Zang et al.

It is certified that error appears in the above-identified patent and that said Letters Patent is hereby corrected as shown below:

In the Claims

In Column 23, Line 52, in Claim 1, delete "s=[$s_m$ $s_k$," and insert --s=[$s_m$, $s_k$,-- therefor In Column 24, Line 27, in Claim 2, delete "dm" and insert --$d_m$-- therefor In Column 24, Line 36, in Claim 3, delete "so" and insert --$s_0$-- therefor In Column 24, Line 55, in Claim 5, delete "so" and insert --$s_0$-- therefor In Column 26, Line 21, in Claim 11, delete "so" and insert --$s_0$-- therefor In Column 26, Line 21, in Claim 11, delete "so" and insert --$s_0$-- therefor In Column 26, Line 41, in Claim 13, delete "so" and insert --$s_0$-- therefor Signed and Sealed this
Twelfth Day of March, 2024

*Katherine Kelly Vidal*
Katherine Kelly Vidal
*Director of the United States Patent and Trademark Office*